US010307672B2

(12) United States Patent
Takahagi et al.

(10) Patent No.: US 10,307,672 B2
(45) Date of Patent: Jun. 4, 2019

(54) DISTRIBUTION SYSTEM, DISTRIBUTION METHOD, AND DISTRIBUTION DEVICE

(71) Applicant: Moff, Inc., Tokyo (JP)

(72) Inventors: Akinori Takahagi, Tokyo (JP); Motohiro Yonesaka, Kanagawa (JP)

(73) Assignee: Moff, Inc., Tokyo (JP)

( * ) Notice: Subject to any disclaimer, the term of this patent is extended or adjusted under 35 U.S.C. 154(b) by 270 days.

(21) Appl. No.: 15/311,900

(22) PCT Filed: May 19, 2014

(86) PCT No.: PCT/JP2014/063188
§ 371 (c)(1),
(2) Date: Feb. 1, 2017

(87) PCT Pub. No.: WO2015/177835
PCT Pub. Date: Nov. 26, 2015

(65) Prior Publication Data
US 2017/0182413 A1 Jun. 29, 2017

(51) Int. Cl.
*A63F 13/211* (2014.01)
*A63F 13/428* (2014.01)
(Continued)

(52) U.S. Cl.
CPC .......... *A63F 13/428* (2014.09); *A63F 13/211* (2014.09); *A63F 13/212* (2014.09);
(Continued)

(58) Field of Classification Search
CPC .... A63F 13/428; A63F 13/211; A63F 13/212; A63F 13/2145; G06F 3/011; G06K 9/00248; G06K 9/00335
(Continued)

(56) References Cited

U.S. PATENT DOCUMENTS

2002/0009989 A1   1/2002 Kanesaka et al.
2005/0212767 A1*  9/2005 Marvit .................. G06F 1/1626
                                                  345/158
(Continued)

FOREIGN PATENT DOCUMENTS

JP    H11-290557    10/1999
JP    2002-044724    2/2002
(Continued)

OTHER PUBLICATIONS

International Search Report dated Aug. 26, 2014.
(Continued)

*Primary Examiner* — Omkar A Deodhar
*Assistant Examiner* — Shauna-Kay Hall
(74) *Attorney, Agent, or Firm* — IPUSA, PLLC

(57) ABSTRACT

A distribution system is provided, the distribution system including a mobile communication terminal for detecting a gesture of a user by using a gesture detection device that is wirelessly connected, and a distribution device that can communicate with the mobile communication terminal, the distribution system including an accepting unit configured to accept registration of first acceleration data expressing a variation in acceleration within a predetermined time, and advertisement data indicating an advertisement to be displayed on the mobile communication terminal; a distributing unit configured to distribute the first acceleration data and the advertisement data to the mobile communication terminal; a comparing unit configured to compare the distributed first acceleration data with second acceleration data expressing the gesture of the user sent from the gesture detection device; and a first outputting unit configured to output the advertisement data, when the comparing unit makes the comparison.

9 Claims, 29 Drawing Sheets

(51) Int. Cl.
  A63F 13/212    (2014.01)
  A63F 13/2145   (2014.01)
  G06F 3/01      (2006.01)
  G06F 3/0488    (2013.01)
  G06K 9/00      (2006.01)
  G06Q 30/02     (2012.01)
  G07F 17/32     (2006.01)
  H04N 21/442    (2011.01)
  H04N 21/81     (2011.01)

(52) U.S. Cl.
  CPC .......... *A63F 13/2145* (2014.09); *G06F 3/011* (2013.01); *G06F 3/04883* (2013.01); *G06K 9/00248* (2013.01); *G06K 9/00335* (2013.01); *G06Q 30/0203* (2013.01); *G07F 17/3255* (2013.01); *H04N 21/44218* (2013.01); *H04N 21/812* (2013.01); *A63F 2300/10* (2013.01); *G08C 2201/32* (2013.01)

(58) Field of Classification Search
  USPC ........................................................ 463/36
  See application file for complete search history.

(56) References Cited

U.S. PATENT DOCUMENTS

| | | | | |
|---|---|---|---|---|
| 2007/0139370 | A1* | 6/2007 | Lu | G06F 3/011 345/156 |
| 2008/0015017 | A1 | 1/2008 | Ashida et al. | |
| 2010/0016080 | A1* | 1/2010 | Garden | A63F 13/12 463/41 |
| 2010/0124949 | A1* | 5/2010 | Demuynck | G06F 1/1626 455/569.1 |
| 2010/0222046 | A1* | 9/2010 | Cumming | G06Q 30/02 455/418 |
| 2011/0270679 | A1* | 11/2011 | Tziortzis | G06Q 30/02 705/14.58 |
| 2012/0112995 | A1 | 5/2012 | Maeda | |
| 2012/0122554 | A1* | 5/2012 | Paquet | A63F 13/61 463/25 |
| 2013/0102330 | A1* | 4/2013 | Lee | H04W 4/21 455/456.3 |
| 2013/0166397 | A1 | 6/2013 | Byun et al. | |
| 2014/0316884 | A1* | 10/2014 | Munisamy | G06Q 30/0251 705/14.49 |
| 2015/0186944 | A1* | 7/2015 | Forsblom | G06Q 30/0267 705/14.64 |

FOREIGN PATENT DOCUMENTS

| | | |
|---|---|---|
| JP | 2007-300980 | 11/2007 |
| JP | 2012-103840 | 5/2012 |
| JP | 2012-155616 | 8/2012 |
| JP | 2013-134494 | 7/2013 |

OTHER PUBLICATIONS

C.S. Myers and L.R. Rabiner, "A Comparative Study of Several Dynamic Time-Warping Algorithms for Connected-Word Recognition", The Bell System Technical Journal, vol. 60, No. 7, Sep. 1981.
"Dynamic time warping", Wikipedia, http://en.wikipedia.org/wiki/Dynamic_time_warping.

* cited by examiner

FIG.7
(a)
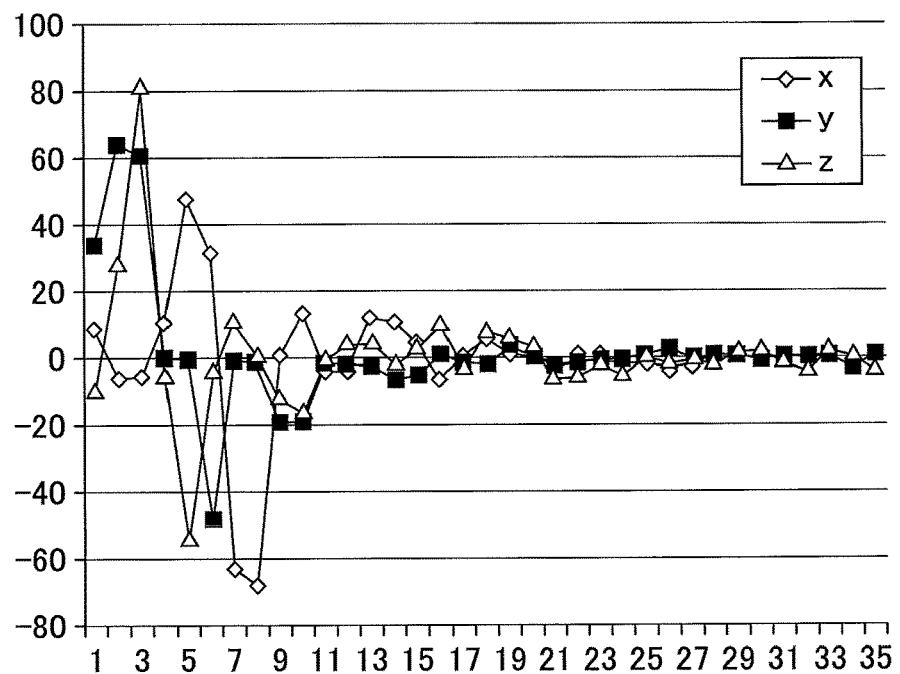
(b)
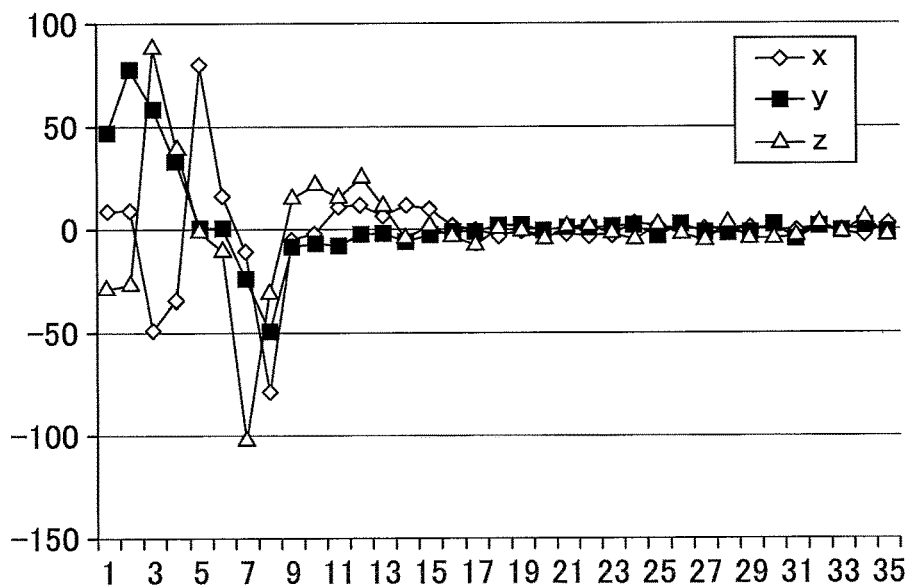

FIG.8

| REGISTRATION WAVEFORM NUMBER | OUTPUT DATA |
|---|---|
| 1 | userdata_001.aac |
| 2 | preset_001.wav |
| 3 | preset_002.wav |

FIG.9

| CONDITION (THRESHOLD) | CONDITION (APPLICATION DATA) | OUTPUT DATA |
|---|---|---|
| X>THRESHOLD A | FLAG ON | drive.mp3 |
| X>THRESHOLD A | FLAG OFF | ignition.mp3 |
| X>THRESHOLD A AND Y>THRESHOLD B | FLAG ON | drift.mp3 |
| X>THRESHOLD A AND Y>THRESHOLD B AND Z>THRESHOLD C | FLAG ON | crash.mp3 |

| CONDITION (THRESHOLD) | CONDITION (APPLICATION DATA) | OUTPUT DATA |
|---|---|---|
| X>THRESHOLD A | NO HISTORY | preset_101.wav |
| X>THRESHOLD A AND Y>THRESHOLD B | NO HISTORY | preset_102.wav |
| X>THRESHOLD A AND Y>THRESHOLD B AND Z>THRESHOLD C | NO HISTORY | preset_103.wav |
| ⋮ | ⋮ | ⋮ |
| X>THRESHOLD A | preset_101.wav→ preset_102.wav→ preset_103.wav | preset_101.wav, preset_special.wav |
| X>THRESHOLD A AND Y>THRESHOLD B | preset_101.wav→ preset_102.wav→ preset_103.wav | preset_102.wav, preset_special.wav |
| X>THRESHOLD A AND Y>THRESHOLD B AND Z>THRESHOLD C | preset_101.wav→ preset_102.wav→ preset_103.wav | preset_103.wav, preset_special.wav |

FIG.16

| REGISTRATION WAVEFORM NUMBER | 1 | 2 | 3 |
|---|---|---|---|
| GESTURE 1 | 720 | 1019 | 1170 |
| GESTURE 2 | 1083 | 729 | 1158 |
| GESTURE 3 | 775 | 891 | 727 |

FIG.23

| ID | NAME | GESTURE DATA | VOICE SOUND DATA | ADVERTISEMENT DATA |
|---|---|---|---|---|
| 1 | Bike | acceleration.dat | acceleration.mp3 | bikeinfo.html<br>bikeinfo_award.html |
| 2 | Toy gun | trigger.dat | bang.mp3 | toygans_catalog.mov |
| 3 | Sword | swingsword_v.dat<br>swingsword_h.dat | swingsword_v.mp3<br>swingsword_h.mp3 | bushidoclub_intro.swf |
| : | : | : | : | : |

| GENDER | AGE | COUNTRY | FREQUENCY | TIME AND DATE |
|---|---|---|---|---|
| F | 12 | JP | 2 | 2014-05-16 14:35:00<br>2014-05-10 10:02:00 |
| M | 22 | US | 128 | 2014-05-16 15:55:00<br>2014-05-16 15:50:00 |
| M | 18 | DE | 20 | 2014-01-01 10:05:00<br>2013-12-25 01:35:00 |
| .. | .. | .. | .. | .. |

| ID | NAME | GESTURE DATA | VOICE SOUND DATA | ADVERTISEMENT DATA | TIME AND DATE |
|---|---|---|---|---|---|
| 1 | Bike | acceleration.dat | acceleration.mp3 | bikeinfo.html<br>bikeinfo_award.html | 2014-05-10 10:00:00 |
| .. | .. | .. | .. | .. | .. |

| GENDER | AGE | COUNTRY | FREQUENCY | TIME AND DATE |
|---|---|---|---|---|
| F | 12 | JP | 1 | 2014-05-10 10:02:00 |

245

FIG.27
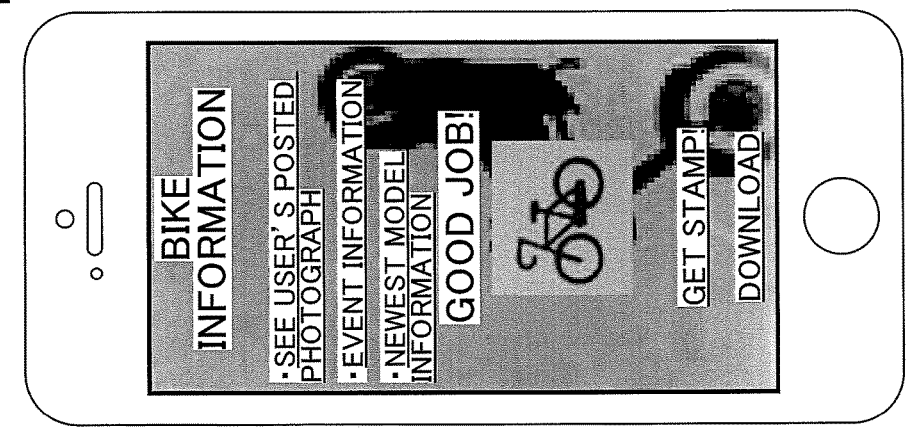
(c)
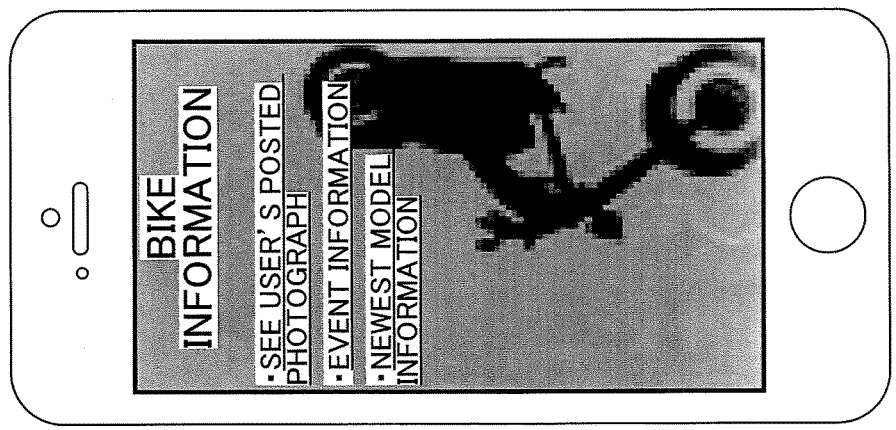
(b)
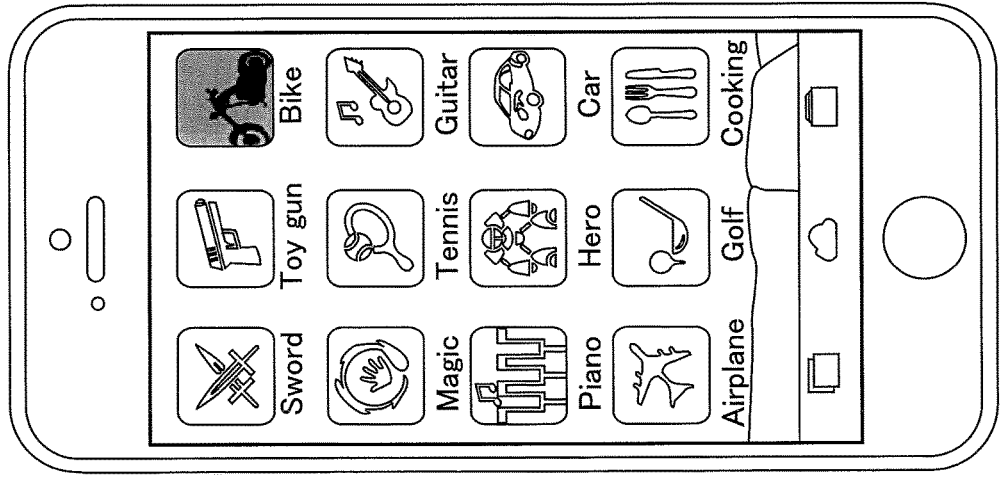
(a)

FIG.28
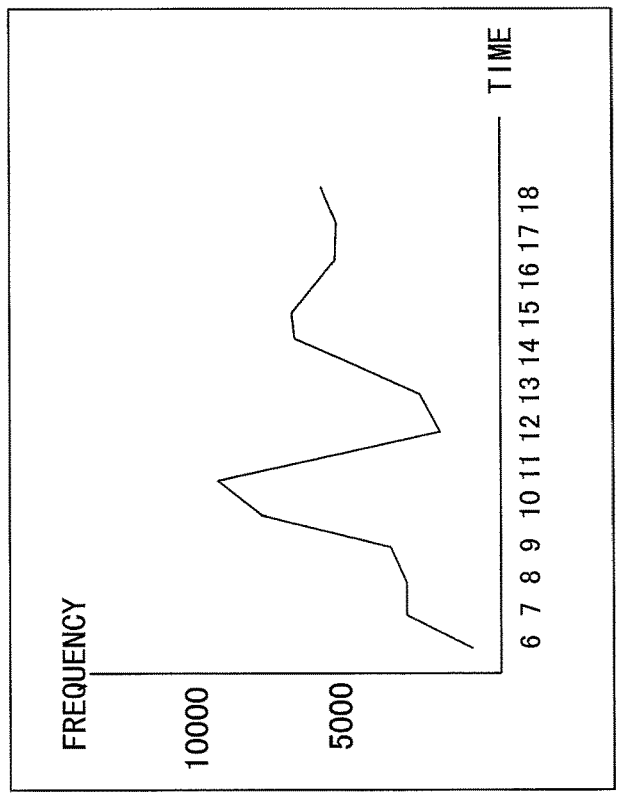
(a)
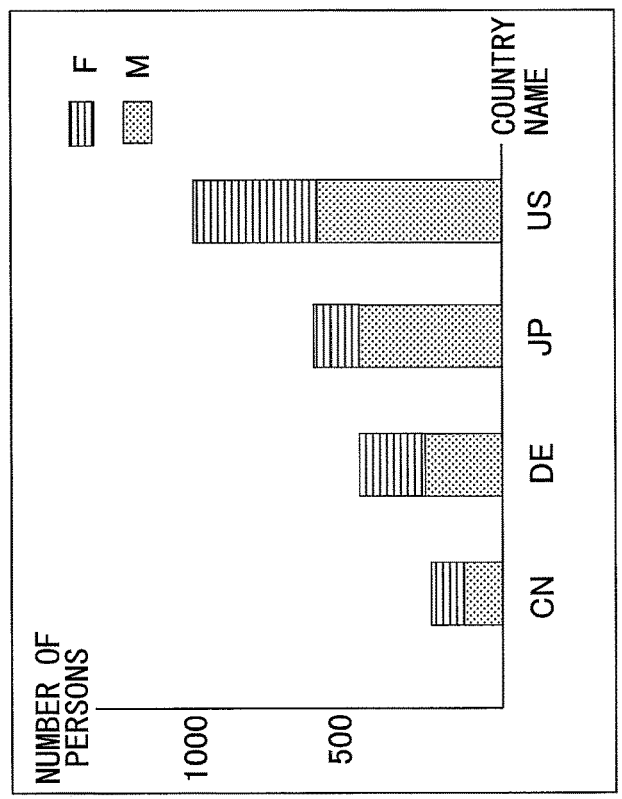
(b)

DISTRIBUTION SYSTEM, DISTRIBUTION METHOD, AND DISTRIBUTION DEVICE

TECHNICAL FIELD

The present invention is related to a distribution system, a distribution method, and a distribution device.

BACKGROUND ART

Devices including sensors such as an acceleration sensor, an angular velocity sensor, and a photosensor, etc., are widely used. For example, a mobile communication terminal such as a smartphone or a tablet, which is equipped with a built-in acceleration sensor, can recognize a three-dimensional gesture of a user registered in advance, and execute an instruction according to the recognized gesture.

Furthermore, there is known a system for providing intuitive playing activities, by recognizing a gesture of a user through a remote controller of a video game console equipped with a built-in acceleration sensor, and associating the recognized gesture with a gesture of a character in the video game (Patent Literature 1, Patent Literature 2).

Furthermore, there is known a technology of recognizing a physical behavior (beating, stroking, etc.) of a user with respect to a robot for reproducing contents, and reproducing contents according to the recognized gesture (Patent Literature 3), and a technology of controlling a device by combining voice sounds and gestures (Patent Literature 4).

As a method for determining whether a physical gesture of a user described above matches a gesture registered in advance, for example, there is known an algorithm referred to as Dynamic Time-Warping (Non-patent Literature 1, Non-patent Literature 2).

CITATION LIST

Patent Literature

[PTL 1]
U.S. Unexamined Patent Application Publication No. 2008-0015017
[PTL 2]
Japanese Unexamined Patent Application Publication No. 2007-300980
[PTL 3]
Japanese Unexamined Patent Application Publication No. 2012-155616
[PTL 4]
Japanese Unexamined Patent Application Publication No. 2012-103840
[NPL 1]
C. S. MYERS and L. R. RABINER, "A Comparative Study of Several Dynamic Time-Warping Algorithms for Connected-World Recognition", THE BELL SYSTEM TECHNICAL JOURNAL, Vol. 60, No. 7, September 1981
[NPL 2]
"Dynamic time warping", Wikipedia, en.wikipedia.org/wiki/Dynamic_time_warping

SUMMARY OF INVENTION

Technical Problem

There is demand for applying the technology of recognizing the user's gestures with a sensor, to easy playing activities. Furthermore, there is demand for distributing an advertisement of a certain article or a service through such an easy playing activity, to obtain advertisement income.

However, in the conventional technology, there have been no mechanisms for distributing advertisements and obtaining advertisement income through playing activities using user's gestures.

The present invention has been made in view of the above problem, and an object of the present invention is to enable the distribution of advertisements through easy playing activities using a sensor.

Solution to Problem

In order to solve the above problem and achieve the above object, a distribution system according to an embodiment of the present invention includes a mobile communication terminal for detecting a gesture of a user by using a gesture detection device that is wirelessly connected, and a distribution device that can communicate with the mobile communication terminal, the distribution system including an accepting unit configured to accept registration of first acceleration data expressing a variation in acceleration within a predetermined time, and advertisement data indicating an advertisement to be displayed on the mobile communication terminal;

a distributing unit configured to distribute the first acceleration data and the advertisement data to the mobile communication terminal;

a comparing unit configured to compare the distributed first acceleration data with second acceleration data expressing the gesture of the user sent from the gesture detection device; and a first outputting unit configured to output the advertisement data, when the comparing unit makes the comparison.

Furthermore, a distribution method according to an embodiment of the present invention is executed by a distribution system including a mobile communication terminal for detecting a gesture of a user by using a gesture detection device that is wirelessly connected, and a distribution device that can communicate with the mobile communication terminal, the distribution method including an accepting step of accepting registration of first acceleration data expressing a variation in acceleration within a predetermined time, and advertisement data indicating an advertisement to be displayed on the mobile communication terminal;

a distributing step of distributing the first acceleration data and the advertisement data to the mobile communication terminal;

a comparing step of comparing the distributed first acceleration data with second acceleration data expressing the gesture of the user sent from the gesture detection device; and a first outputting step of outputting the advertisement data, when the comparison is made at the comparing step.

Furthermore, a distribution device according to an embodiment of the present invention can communicate with a mobile communication terminal for detecting a gesture of a user by using a gesture detection device that is wirelessly connected, the distribution device including an accepting unit configured to accept registration of first acceleration data expressing a variation in acceleration within a predetermined time, and advertisement data indicating an advertisement to be displayed on the mobile communication terminal; and a distributing unit configured to distribute, to the mobile communication terminal, the first acceleration data, which is compared with second acceleration data expressing the gesture of the user sent from the gesture detection device, and the advertisement data, which is output when the comparison with the first acceleration data is made.

Advantageous Effects of Invention

According to the present invention, an advertisement can be distributed through an easy playing activity using a sensor.

BRIEF DESCRIPTION OF DRAWINGS

FIG. 7 is a diagram illustrating an example of waveform data expressing gestures of a user;

FIG. 8 is a diagram illustrating an example of a table associating a registration waveform data with output data;

FIG. 9 is a diagram illustrating an example of a table associating a condition (threshold and application data) with output data;

FIG. 10 is a diagram illustrating an example of a table associating a condition (threshold and application data) with output data;

FIG. 16 is a diagram illustrating a result obtained by comparing registration waveform data with detection waveform data;

FIG. 23 is a diagram illustrating an example of a table storing distribution management data;

FIG. 24 is a diagram illustrating an example of a table storing statistic data;

FIG. 25 is a diagram illustrating an example of a table storing management data;

FIG. 26 is a diagram illustrating an example of a table storing attribute data;

FIG. 27 is a diagram illustrating an example of an output screen of the mobile communication terminal according to an embodiment of the present invention;

FIG. 28 is a diagram illustrating an example of an output screen of statistic data;

DESCRIPTION OF EMBODIMENTS

In the following, embodiments of the present invention will be explained with reference to drawings.

A. Gesture detection system
 1. Overview
 2. Hardware configuration
 3. Functions
 4. Examples of operations
 5. Examples of applications
B. Distribution system
 1. Overview
 2. Hardware configuration
 3. Functions
 4. Examples of operations
 5. Effects <<A. Gesture Detection System>>

In the following, a description is given of two systems, namely, a detection system for detecting, with a mobile communication terminal, gestures of a user using a gesture detection device, and a distribution system for distributing advertisements by using the detection system. First, a description is given of a gesture detection system including a gesture detection device and a mobile communication terminal.

<<1. Overview>>

Figure 1:
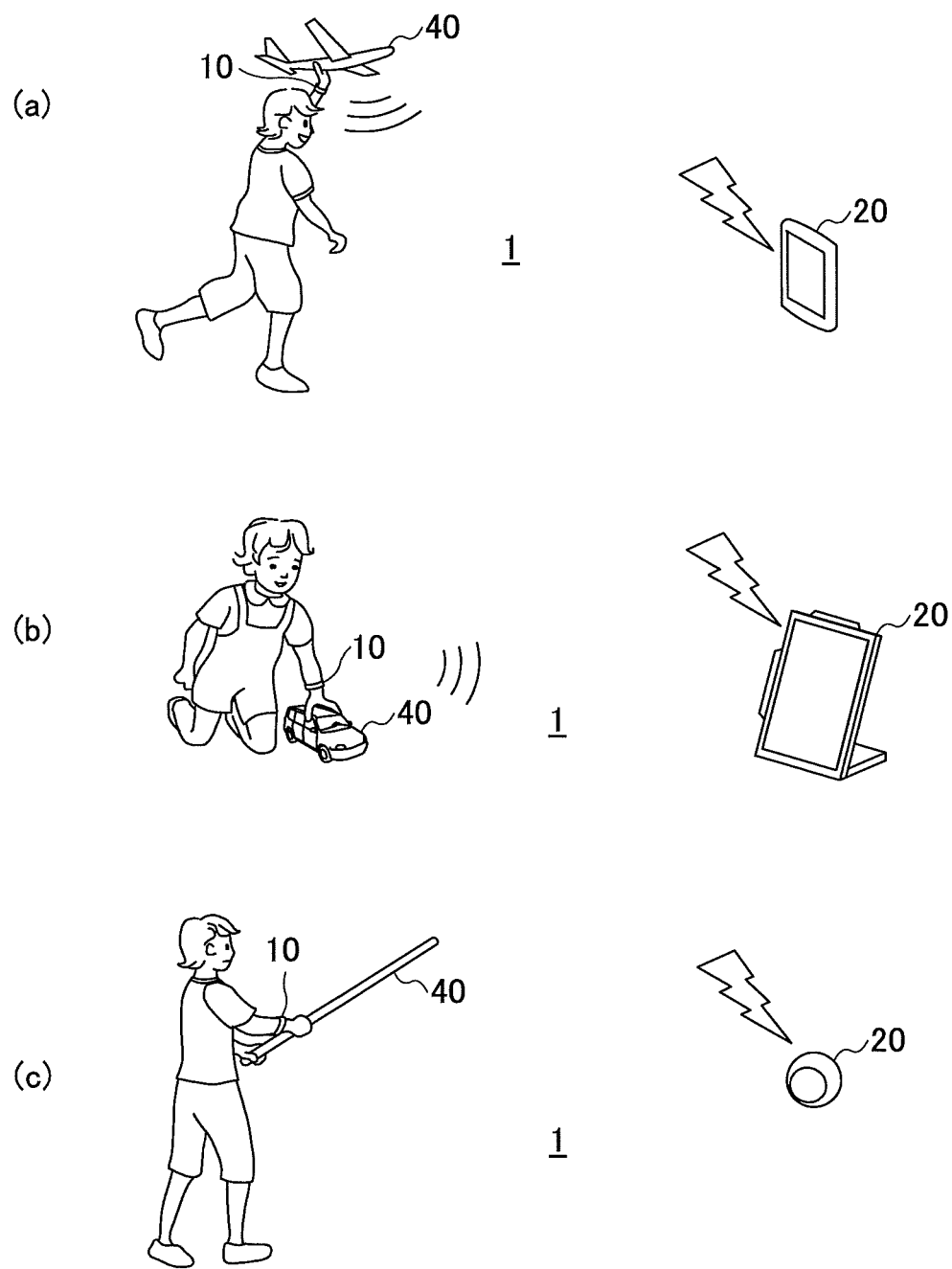
FIG. 1 indicates an overview of the present invention.

FIG. 1 indicates an example of a gesture detection system 1 according to an embodiment of the present invention. The gesture detection system 1 includes a gesture detection device 10 attached to a toy 40 held by a user or attached to the user, and a mobile communication terminal 20 that can communicate with the gesture detection device 10. The gesture detection device 10 and the mobile communication terminal 20 can communicate with each other by a wireless communication method such as BLUETOOTH (registered trademark) and ZIGBEE.

For example, the user wears the gesture detection device 10 that is a wrist band type on his own arm, and operates the toy 40 such as a model of an airplane or a passenger vehicle. The gesture detection device 10 is equipped with a built-in sensor such as an acceleration sensor and an angular velocity sensor, and sends the value of the acceleration or the angular velocity, which is detected according to a gesture of the user, to the mobile communication terminal 20 as needed. For example, when the variation (expressed by waveforms) in the received value of acceleration matches a waveform registered in advance, the mobile communication terminal 20 is able to output a voice sound corresponding to the gesture. Furthermore, the mobile communication terminal 20 holds voice sounds corresponding to various gestures. Accordingly, the user can try various operations of the toy and hear voice sounds corresponding to the operations, to make imaginations, and enjoy an easy and intuitive playing activity. Note that the gesture detection device 10 may include any kind of sensor in addition to the acceleration sensor and the angular velocity sensor, such as a photosensor and a pressure sensor, etc.

FIG. 1 (*a*) illustrates an example in which the user is wearing the gesture detection device 10 that is a wrist band type on his own arm, and is operating the toy 40 (a model of an airplane), and a voice sound is output from the mobile communication terminal 20 (smartphone). In this example, when the user accelerates the model of an airplane, an engine sound at the time of high revolution is output, and when the user decelerates the model of an airplane, an engine sound at the time of low revolution is output. FIG. 1 (*b*) illustrates an example in which the user is wearing the gesture detection device 10 that is a wrist band type on his own arm, and is operating the toy 40 (a model of a passenger vehicle), and a voice sound is output from the mobile communication terminal 20 (tablet). In this example, for example, when the user moves the model of a passenger vehicle, an ignition sound of an engine is output, and when the user turns the model of a passenger vehicle to the left and right, a slipping sound of tires is output. FIG. 1 (*c*) illustrates an example in which the user is wearing the gesture detection device 10 on his own arm, and is holding and operating the toy 40 (a model of a sword), and a voice sound is output from the mobile communication terminal 20 (speaker). In this example, different sounds are output according to the direction in which the user swings the model of a sword.

As described above, the mobile communication terminal 20 can execute a plurality of applications that are prepared according to the differences in the toys 40 and the method of playing with the toy 40. Accordingly, for example, the user can use an existing toy that has not been used for a long time, to output various voices sounds, and experience a new playing activity. Note that the mobile communication terminal 20 is not limited to the above examples; the mobile communication terminal 20 may be a notebook PC or a display.

Figure 2:
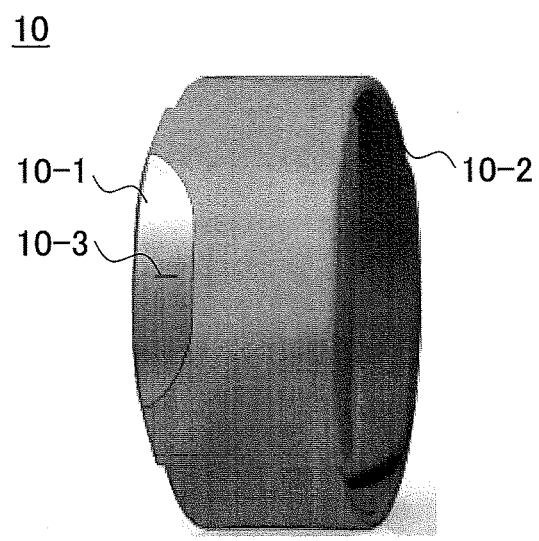
FIG. 2 illustrates the exterior appearance of a gesture detection device according to an embodiment of the present invention.

FIG. 2 illustrates the exterior appearance of the gesture detection device 10 according to an embodiment of the present invention. As illustrated in FIG. 2, the gesture detection device 10 includes a housing case 10-1 equipped with a built-in sensor or wireless communication device, etc., and a belt 10-2 to be attached to the toy 40 or the arm or the wrist of the user. Furthermore, the gesture detection device 10 includes a LED 10-3 that is lighted or that blinks when operated. Note that the gesture detection device 10 may include a cable, a tape, a magnet, and a clip, etc., instead of a belt, to be attached to the toy 40.

<<2. Hardware Configuration>>

Figure 3:
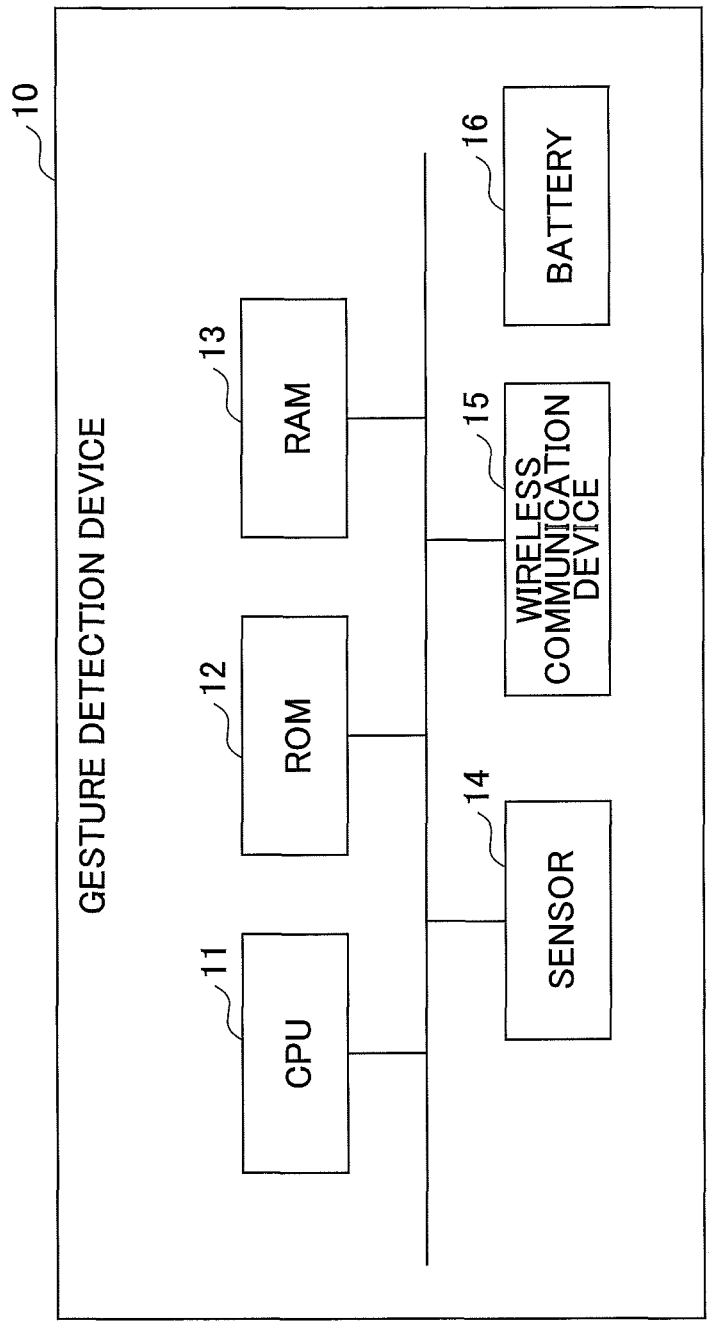
FIG. 3 is a hardware configuration diagram of the gesture detection device according to an embodiment of the present invention.
Figure 4:
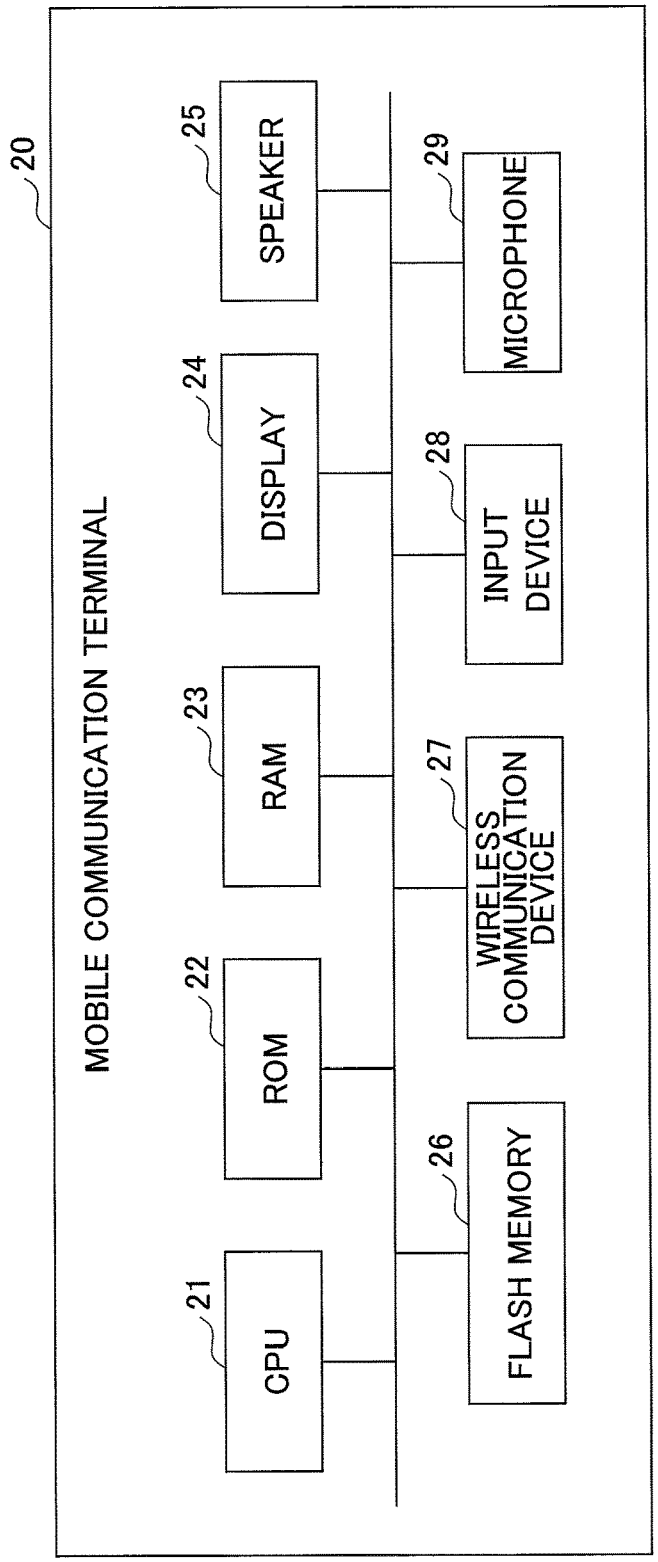
FIG. 4 is a hardware configuration diagram of a mobile communication terminal according to an embodiment of the present invention.

Referring to FIGS. 3 and 4, a description is given of the hardware configurations of the gesture detection device 10 and the mobile communication terminal 20 according to an embodiment of the present invention.

<<Gesture Detection Device>>

FIG. 3 is a hardware configuration diagram of the gesture detection device 10 according to an embodiment of the present invention. The gesture detection device 10 includes a CPU 11, a ROM 12, a RAM 13, a sensor 14, a wireless communication device 15, and a battery 16.

The CPU 11 executes programs for controlling the gesture detection device 10. The ROM 12 stores programs executed by the CPU 11 and data necessary for executing the programs. The RAM 13 functions as a work area of the CPU 11. The sensor 14 is a sensor for detecting gestures of a user with respect to the gesture detection device 10, and the sensor 14 is, for example, an acceleration sensor. The acceleration sensor detects the acceleration, for example, in the three axial directions of an X axis, a Y axis, and a Z axis. Furthermore, the sensor 14 may be an angular velocity sensor, a photosensor, or a pressure sensor. Furthermore, the sensor 14 may be a combination of any of these sensors. Note that in the following, a description is given of an example in which the sensor 14 is an acceleration sensor. The wireless communication device 15 is a device for performing communication according to BLUETOOTH (registered trademark), ZIGBEE, or other wireless communication methods. The battery 16 supplies power for driving the gesture detection device 10. A bus 17 interconnects the devices except for the battery 16.

Note that the gesture detection device 10 may include a display device such as liquid crystal display for displaying information received from the mobile communication terminal 20 via the wireless communication device 15.

<<Mobile Communication Terminal>>

FIG. 4 is a hardware configuration diagram of the mobile communication terminal 20 according to an embodiment of the present invention. FIG. 4 illustrates an example of a hardware configuration in a case where the mobile communication terminal 20 is a smartphone. The mobile communication terminal 20 includes a CPU 21, a ROM 22, a RAM 23, a display 24, a speaker 25, a flash memory 26, a wireless communication device 27, an input device 28, and a microphone 29.

The CPU 21 executes programs for controlling the mobile communication terminal 20. The ROM 22 stores programs executed by the CPU 21 and data necessary for executing the programs. The RAM 23 functions as a work area of the CPU 21. The display 24 is a device for outputting video data by driving, for example, a liquid crystal panel. The speaker 25 is a device for changing electric signals into physical vibrations, and outputting voice sound data. The flash memory 26 stores programs executed by the CPU 21 and data necessary for executing the programs, similar to the ROM 22. Furthermore, the flash memory 26 is also used for storing large volumes of data such as voice sound data and video data. The wireless communication device 27 is a device for performing communication according to BLUETOOTH (registered trademark), ZIGBEE, or other wireless communication methods. The input device 28 is a device such as a keyboard, operation buttons, or a touch panel, and accepts operations from the user. The microphone 29 is a device for converting physical vibrations according to voice sounds, into electric signals. A bus 30 interconnects the above devices.

<<3. Functions>>

Figure 5:
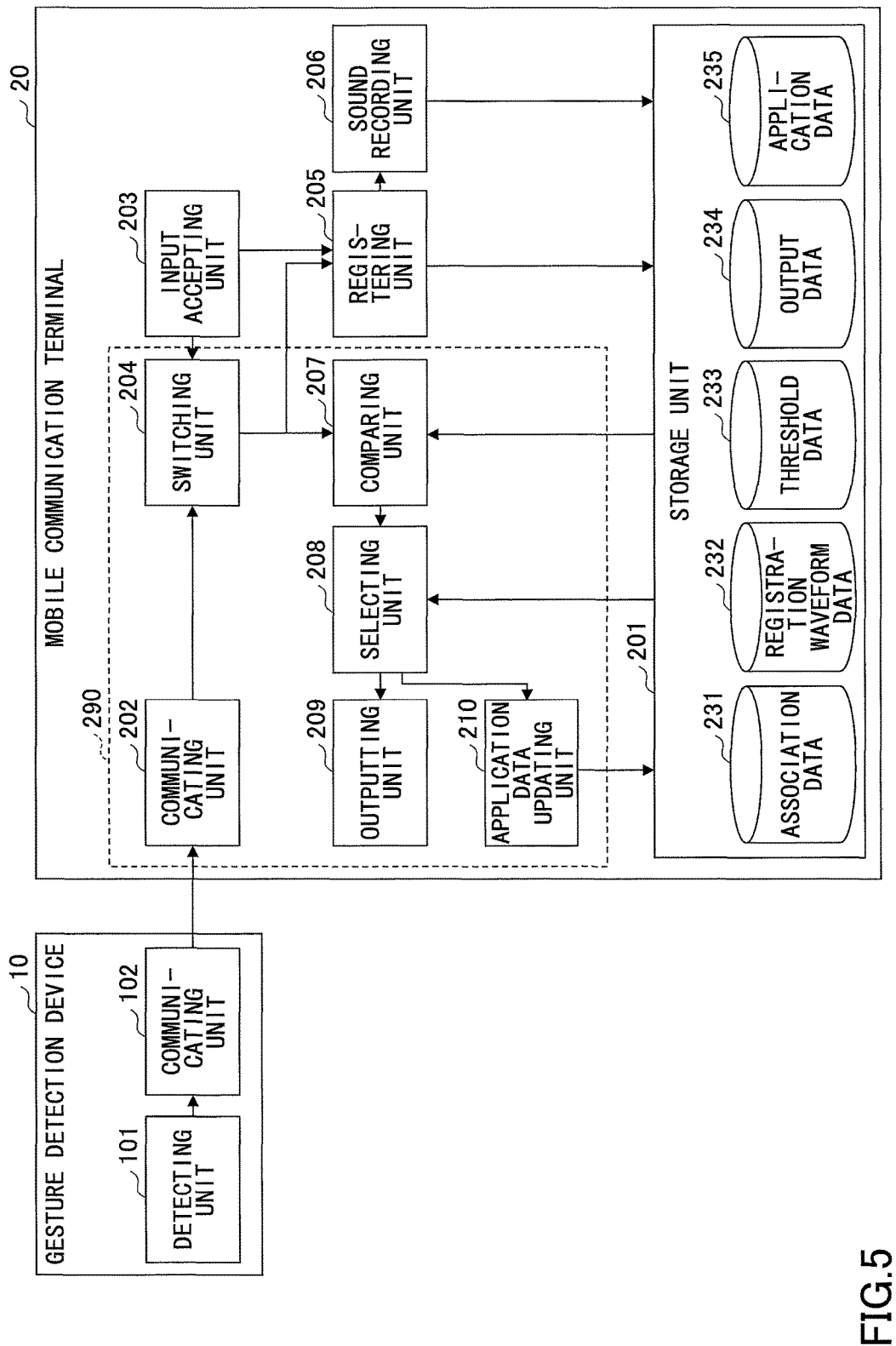
FIG. 5 is a functional block diagram of a gesture detection system according to an embodiment of the present invention.
Figure 6:
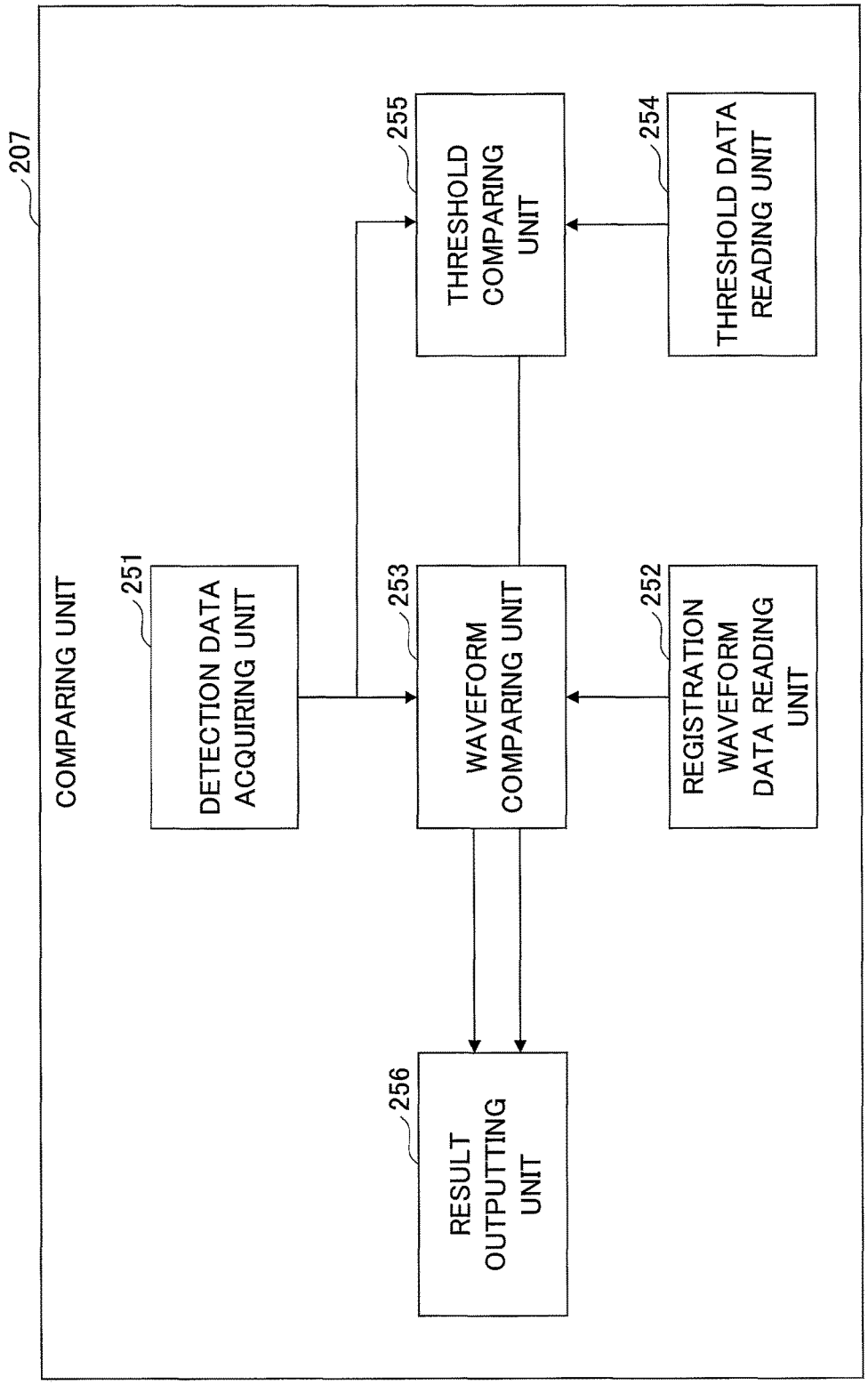
FIG. 6 is a detailed functional block diagram of a gesture detection system according to the embodiment of the present invention.

Referring to FIGS. 5 and 6, a description is given of functional blocks of the gesture detection system 1 according to an embodiment of the present invention.

<<Gesture Detection Device>>

Referring to FIG. 5, a description is given of the functions of the gesture detection device 10 according to an embodiment of the present invention. The gesture detection device 10 includes a detecting unit 101 and a communicating unit 102.

The detecting unit 101 is realized by processes by the sensor 14 of FIG. 3, detects a gesture of a user, and sends data indicating the gesture (hereinafter referred to as detection data) to the mobile communication terminal 20 as needed through the communicating unit 102. For example, when the sensor 14 is an acceleration sensor, the detecting unit 101 detects the acceleration in three axial directions generated by the gesture of the user, and sends the value of the acceleration to the mobile communication terminal 20.

The communicating unit 102 is realized by processes by the wireless communication device 15 of FIG. 3, and sends the detection data detected by the detecting unit 101 to the mobile communication terminal 20 by wireless communication.

<<Mobile Communication Terminal>>

Referring to FIG. 5, a description is given of functions of the mobile communication terminal 20 according to an embodiment of the present invention. In the following descriptions, the functions of the mobile communication terminal 20 are classified into "basic functions", "registration functions", and "output functions".

<<Basic Functions>>

As illustrated in FIG. 5, the mobile communication terminal 20 includes a storage unit 201, a communicating unit 202, an input accepting unit 203, and a switching unit 204.

The storage unit 201 is realized by the ROM 22 or the flash memory 26 of FIG. 4, and stores association data 231, registration waveform data 232, threshold data 233, output data 234, and application data 235.

The association data 231 is data associating the gesture of a user and a voice sound or video data to be output (output data). For example, the association data 231 is stored by tables as illustrated the examples of FIGS. 8, 9, and 10. FIGS. 8, 9, and 10 respectively illustrate association data 231-1, 231-2, and 231-3 of different modes.

The association data 231-1 illustrated in FIG. 8 includes the items of a registration waveform number and output data. The registration waveform number is a number applied to gesture waveform data (registration waveform data) expressing variations in the acceleration, indicating the gestures of a user. An example of a waveform expressing variations in the acceleration registered in advance, is illustrated in FIG. 7 (a). The registration waveform data itself is stored separately in the storage unit 201. The output data identifies voice sound or video data to be output, when data indicating the same gesture as the gesture is input from the gesture detection device 10. Here, the output data is identified by a file name of the voice sound or the video data.

The association data 231-2, 231-3, illustrated in FIGS. 9 and 10 includes the items of a condition (threshold), a condition (application data), and output data. The condition (threshold) expresses a threshold of a value of the acceleration in three axial directions, sent from the gesture detection device 10. The condition (application data) indicates a condition relevant to the application data 235 that is separately stored in the storage unit 201. The application data 235 is, for example, a flag used for selecting output data and output history of the output data. The output data identifies voice sound or video data to be output, when a value of the acceleration satisfying the condition (threshold) is input from the gesture detection device 10, and the condition (application data) is satisfied.

The registration waveform data 232 is one kind of gesture data for defining a gesture of a user. The registration waveform data is waveform data expressing the variation in the acceleration, and is data expressing the variation in the value of the acceleration in the X axis, Y axis, and Z axis directions within a predetermined period. For example, the registration waveform data 232 is waveform data having a waveform as illustrated in FIG. 7 (a).

The threshold data 233 is one kind of gesture data for defining a gesture of a user. The threshold data 233 expresses a threshold with respect to the maximum value of the acceleration in three axial directions, sent from the gesture detection device 10. The threshold data 233 includes thresholds A, B, and C indicated by the association data 231-2 illustrated in FIG. 9.

The output data 234 is voice sound or video data that is output when a condition is satisfied. As illustrated in FIGS. 8, 9, and 10, the output data 234 is provided by a file in any format. Furthermore, although not illustrated, the output data 234 may be a video file in a format of avi, 3gp, and mov. Furthermore, although not illustrated, the output data 234 may be data for generating a vibration of a predetermined pattern in the mobile communication terminal 20.

The application data 235 is data such as a flag used for selecting output data, and an output history of output data, etc., used in an application operating in the mobile communication terminal 20.

The communicating unit 202 is realized by processes by the wireless communication device 27 of FIG. 4, and establishes a connection with the gesture detection device 10 and exchanges data with the gesture detection device 10.

The input accepting unit 203 is realized by the input device 28 of FIG. 4, and accepts an operation input from the user.

The switching unit 204 is realized by processes by the CPU 21 of FIG. 4, and switches the function to be executed by the mobile communication terminal 20 between the registration function or the output function described below, according to an operation input from the user accepted by the input accepting unit 203.

<<Registration Functions>>

The mobile communication terminal 20 has a registration function of accepting a desired gesture of the user, and associating the gesture with output data prepared in advance or new output data obtained by sound recording. In order to realize the registration function, the mobile communication terminal 20 includes a registering unit 205 and a sound recording unit 206.

The registering unit 205 is realized by processes by the CPU 21 of FIG. 4, and associates a desired gesture of the user with output data prepared in advance or new output data obtained by sound recording according to operation input by a user, and registers the associated data in the association data 231-1.

Specifically, first, the registering unit 205 accepts input of a number of a gesture to be registered from the user, through the input accepting unit 203. The input number is used as a registration waveform number of the association data 231-1. Next, the registering unit 205 accepts, through the input accepting unit 203, a selection of whether to select the output data to be associated with the gesture from the output data prepared in advance, or to newly sound record output data to be associated with the gesture. When the user has selected the latter option, the registering unit 205 records the output data through the sound recording unit 206 described below. Next, the registering unit 205 instructs the user to make the desired gesture, and receives detection data detected by the gesture detection device 10. Then, the registering unit 205 uses an input number to store the detection data as new registration waveform data 232. Lastly, the registering unit 205 adds a new entry including the input number and the file name of the output data that has been selected or sound recorded, to the association data 231-1.

The sound recording unit 206 is realized by the microphone 29 of FIG. 4, and records the output data according to an instruction from the registering unit 205.

<<Output Functions>>

The mobile communication terminal 20 includes an output function of receiving the detection data detected by the gesture detection device 10, and outputting predetermined output data when the detection satisfies a predetermined condition. In order to realize the output function, the mobile communication terminal 20 includes a comparing unit 207, a selecting unit 208, an outputting unit 209, and application data updating unit 210.

The comparing unit 207 is realized by processes by the CPU 21 of FIG. 4, and compares the detection data received from the gesture detection device 10 with registered waveform data or a threshold, and transfers the comparison result to the selecting unit 208. FIG. 6 illustrates functional blocks expressing the comparing unit 207 in further detail. The comparing unit 207 includes a detection data acquiring unit 251, a registration waveform data reading unit 252, a waveform comparing unit 253, a threshold data reading unit 254, a threshold comparing unit 255, and a result outputting unit 256.

The detection data acquiring unit 251 acquires the detection data received from the gesture detection device 10. The registration waveform data reading unit 252 reads the registration waveform data 232 stored in the storage unit 201.

The waveform comparing unit 253 compares the detection data (for example, FIG. 7 (b)), acquired by the detection data acquiring unit 251, with the registration waveform data (for example, FIG. 7 (a)) read by the registration waveform data reading unit 252, and identifies the registration waveform data similar to the detection data. Specifically, the waveform comparing unit 253 performs pattern matching by an existing technology disclosed in, for example, Non-patent literature 1, 2, etc., to identify the registration waveform number of the registration waveform data similar to the detection data. According to the methods described in Non-patent literature 1, 2, the similarity of the detection data and the registration waveform data is obtained according to the shortness of the "distance" between the data items. A description of the specific method of calculating the distance is omitted here.

The waveform comparing unit 253 transfers the identified registration waveform number to the result outputting unit 256. Note that when there is no similar registration waveform data (that is, when all of the registration waveform data items are at long distances from the detection data), the waveform comparing unit 253 may transfer a result indicating that there is no corresponding registration waveform number, to the result outputting unit 256. Alternatively, the waveform comparing unit 253 may always identify the nearest registration waveform data, regardless of the distance between the detection data and the registration waveform data, and may transfer the registration waveform number of the identified registration waveform data to the result outputting unit 256.

The threshold data reading unit 254 reads the threshold data 233 stored in the storage unit 201. The threshold comparing unit 255 compares the maximum value of the detection data of each axis (for example, FIG. 7 (b)) acquired by the detection data acquiring unit 251, with the thresholds A, B, and C of each axis indicated by the threshold data read by the threshold data reading unit 254, and transfers the result of comparison to the result outputting unit 256. The result outputting unit 256 outputs the result received from the waveform comparing unit 253 or the threshold comparing unit 255, to the selecting unit 208.

Referring back to FIG. 5, the selecting unit 208 is realized by processes by the CPU 21 of FIG. 4. When the selecting unit 208 receives the result (that is, the registration waveform number of a result of comparison with the threshold) from the comparing unit 207 (result outputting unit 256), the selecting unit 208 refers to the association data 231. Furthermore, the selecting unit 208 refers to the application data 235 stored in the storage unit 201, according to need. Then, the selecting unit 208 selects output data corresponding to the registration waveform number, or output data satisfying a threshold or a condition of the application data. Then, the selecting unit 208 transfers the selected output data to the outputting unit 209. Furthermore, the selecting unit 208 may transfer the result received from the comparing unit 207 (result outputting unit 256) and the selected output data, to the application data updating unit 210.

The outputting unit 209 is realized by the display 24 or the speaker 25 of FIG. 4, and outputs the output data received from the selecting unit 208.

The application data updating unit 210 is realized by processes by the CPU 21 of FIG. 4, and uses the result and the output data received from the selecting unit 208 to update the application data. For example, when the application data is a flag, the application data updating unit 210 sets a flag when the result of comparison with the threshold satisfies a predetermined condition. Furthermore, for example, when the application data is history of output data, the application data updating unit 210 records the history of output data.

<<4. Examples of Operations>>

Referring to FIGS. 11 through 16, a description is given of operations of the gesture detection system 1 according to an embodiment of the present invention. In the examples of FIGS. 11 through 16, a description is given of a registration process in which the user inputs a desired gesture, and the gesture is associated with output data input by sound recording, and an output process in which the user inputs a predetermined gesture, and output data associated with a similar gesture is output. In the examples of FIGS. 11 through 16, the threshold data 233 and the application data 235 are not used. Therefore, in the present embodiment, the functions of the threshold data reading unit 254 and the threshold comparing unit 255 of the comparing unit 207, and the application data updating unit 210, are not used.

<<Registration Process>>

Figure 11:
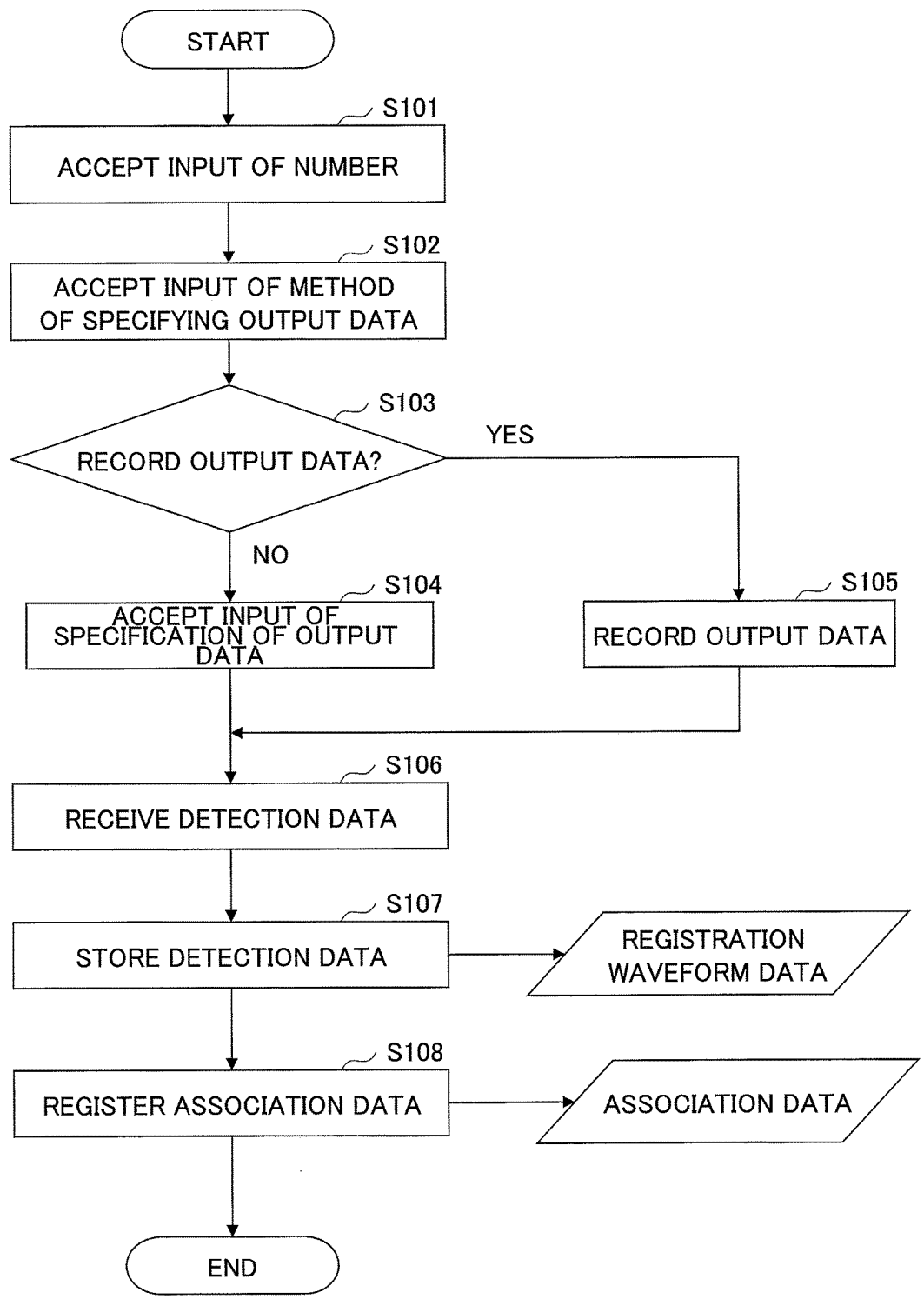
FIG. 11 is a flowchart of a registration process.

Referring to FIG. 11, a description is given of a registration process executed by the gesture detection system 1. The registration process illustrated in FIG. 11 is executed from a state after the gesture detection device 10 and the mobile communication terminal 20 are connected by wireless communication, and the user has operated the mobile communication terminal 20 to execute the registration function. That is, the registration process is executed from a state in which the switching unit 204 of the mobile communication terminal 20 described above has switched the function to be executed by the mobile communication terminal 20, to a registration function.

First, the input accepting unit 203 accepts input of a number for identifying a gesture to be registered, from the user (step S101). Next, the input accepting unit 203 accepts a selection input of the method of specifying the output data (whether to use existing output data or to record new output data), from the user (step S102). Here, when output data is to be newly recorded (YES in step S103), the sound recording unit 206 records a new voice sound (step S105). On the other hand, when output data is not to be newly recorded (NO in step S103), the input accepting unit 203 accepts a selection of output data selected by the user from a list of existing output data items displayed on the display 24 (step S104).

Then, the registering unit 205 instructs the user to make the gesture, through the display 24 or the speaker 25, etc. The registering unit 205 receives the detection detected by the detecting unit 101 of the gesture detection device 10 (step S106). Next, the registering unit 205 stores the received detection data as registration waveform data having a registration waveform number corresponding to the number accepted in step S101 (step S107). Then, the registering unit 205 registers a new entry including the number accepted in step S101 and the file name of the recorded output data, in the association data 231-1 (step S108).

<<Output Process>>

Figure 12:
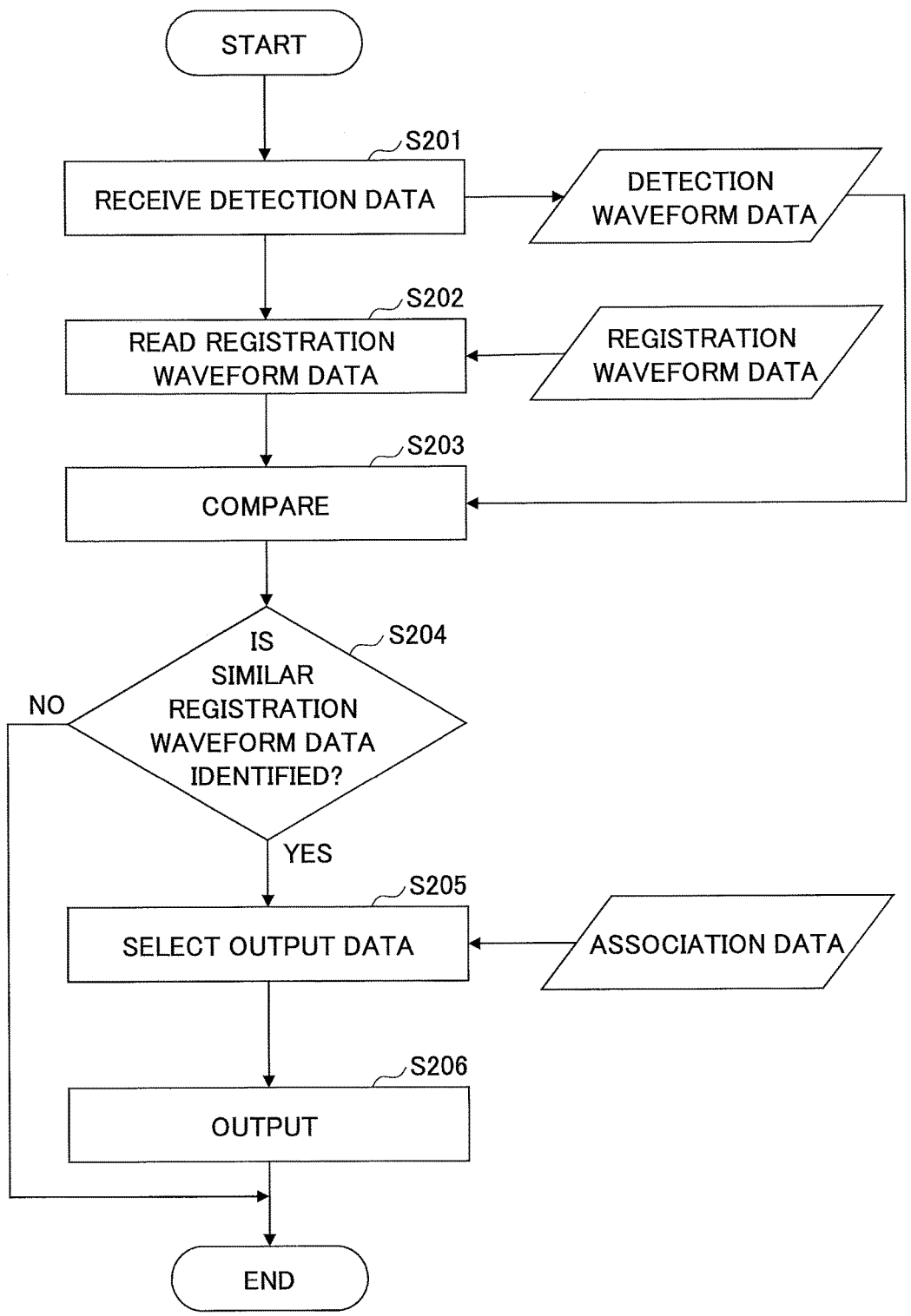
FIG. 12 is a flowchart of an output process.

Referring to FIG. 12, a description is given of an output process executed by the gesture detection system 1. The output process illustrated in FIG. 12 is executed from a state after the gesture detection device 10 and the mobile communication terminal 20 are connected by wireless communication, and the user has operated the mobile communication terminal 20 to execute the output function. That is, the output process is executed from a state in which the switching unit 204 of the mobile communication terminal 20 described above has switched the function to be executed by the mobile communication terminal 20, to an output function. In this state, the user operates the toy 40, in a state where the gesture detection device 10 is attached.

First, the comparing unit 207 (detection data acquiring unit 251) receives the detection data sent from the gesture detection device 10, through the communicating unit 202 (step S201). Next, the comparing unit 207 (registration waveform data reading unit 252) reads the registration waveform data 232 stored in the storage unit 201 (step S202). Next, the comparing unit 207 (waveform comparing unit 253) compares the detection data with the registration waveform data 232, by performing pattern matching (step S203). Then, when the comparing unit 207 is able to identify similar registration waveform data (YES in step S204), the selecting unit 208 refers to the association data 231, and selects output data corresponding to the registration waveform number of the identified registration waveform data (step S205). Furthermore, the outputting unit 209 outputs the output data selected in step S205 (step S206). On the other hand, when the comparing unit 207 is unable to identify similar registration waveform data (NO in step S204), the process is ended without outputting output data.

Note that the above processes are repeatedly executed while the user is operating the toy 40.

<<Specific Example of Registration Process>>

Figure 13:
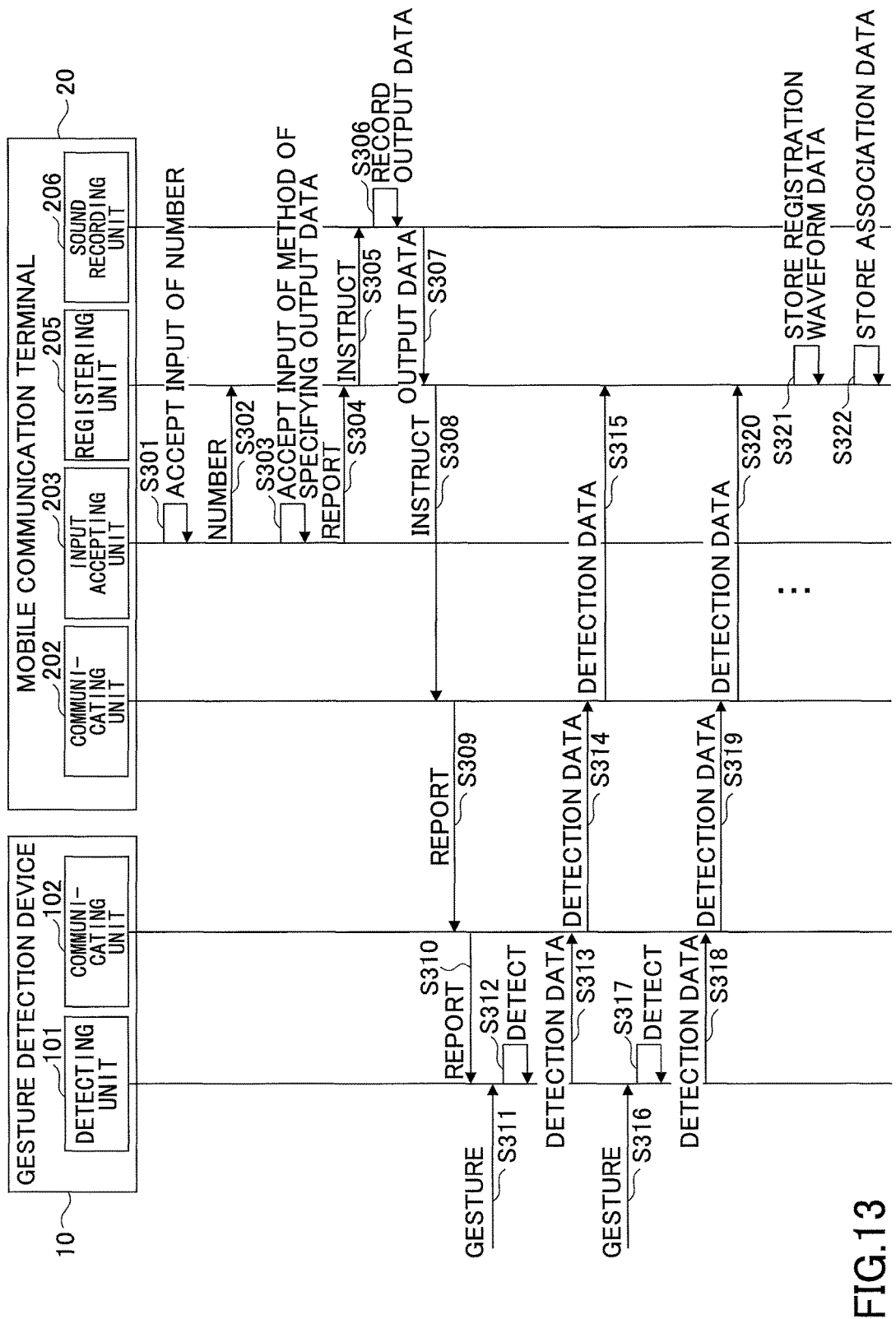
FIG. 13 is a sequence diagram of a specific example of a registration process.

Referring to FIG. 13, a specific description is given of the registration process executed by the gesture detection system 1. Note that in the following description, it is assumed that no data is registered in the example of the association data 231-1 illustrated in FIG. 8.

First, the input accepting unit 203 accepts input of a number "1" for identifying a gesture to be registered, from the user (step S301). The input accepting unit 203 transfers the accepted number "1" to the registering unit 205 (step S302). Next, the input accepting unit 203 accepts input of a selection to newly record output data, from the user (step S303). The input accepting unit 203 reports that a selection to newly record data has been made, to the registering unit 205 (step S304). The registering unit 205 instructs the sound recording unit 206 to start recording output data (step S305). The sound recording unit 206 prompts the user to input a voice sound by a report using a sound or a video, and then records a sound (step S306). The sound recording unit 206 stores the recorded data as the output data 234, in the storage unit 201, and reports the file name "userdata_001.aac" to the registering unit 205 (step S307).

When the sound recording of output data is ended, the registering unit 205 instructs the communicating unit 202 to send a report indicating that detection data indicating the gesture of the user can be received (step S308). The communicating unit 202 sends the above report to the communicating unit 102 of the gesture detection device 10 (step S309). The communicating unit 102 transfers the received report to the detecting unit 101 (step S310). At this time, the registering unit 205 may instruct the user to make a gesture, through the display 24 or the speaker 25, etc., in parallel with step S310.

The user makes the gesture of operating the toy 40, with the gesture detection device 10 attached (step S311). The detecting unit 101 detects the values of acceleration in three axial directions applied to the detecting unit 101 according to the gesture of the user (step S312). The detecting unit 101 transfers the detected values as detection data, to the communicating unit 102 (step S313). The communicating unit 102 sends the detection data to the communicating unit 202 of the mobile communication terminal 20 (step S314). The communicating unit 202 transfers the received detection data to the registering unit 205 (step S315).

Furthermore, the user continues making gestures, and similar to steps S311 through S315, the registering unit 205 receives the detection data (steps S316 through S320). The same steps as steps S316 through S320 are subsequently repeated for a predetermined number of times. The waveform illustrated in FIG. 7 (a) expresses detection data items that have been received during a predetermined time period as described above. The registering unit 205 stores the detection data items that have been received during a predetermined time period, as the registration waveform data 232 having the number "1" input in step S301 (step S321). Then, the registering unit 205 registers, in the association data 231-1, the file recorded in step S306 as output data "userdata_001.aac", with the number "1" input in step S301 as a registration waveform number (step S322).

<<Specific Example of Output Process>>

Figure 14:
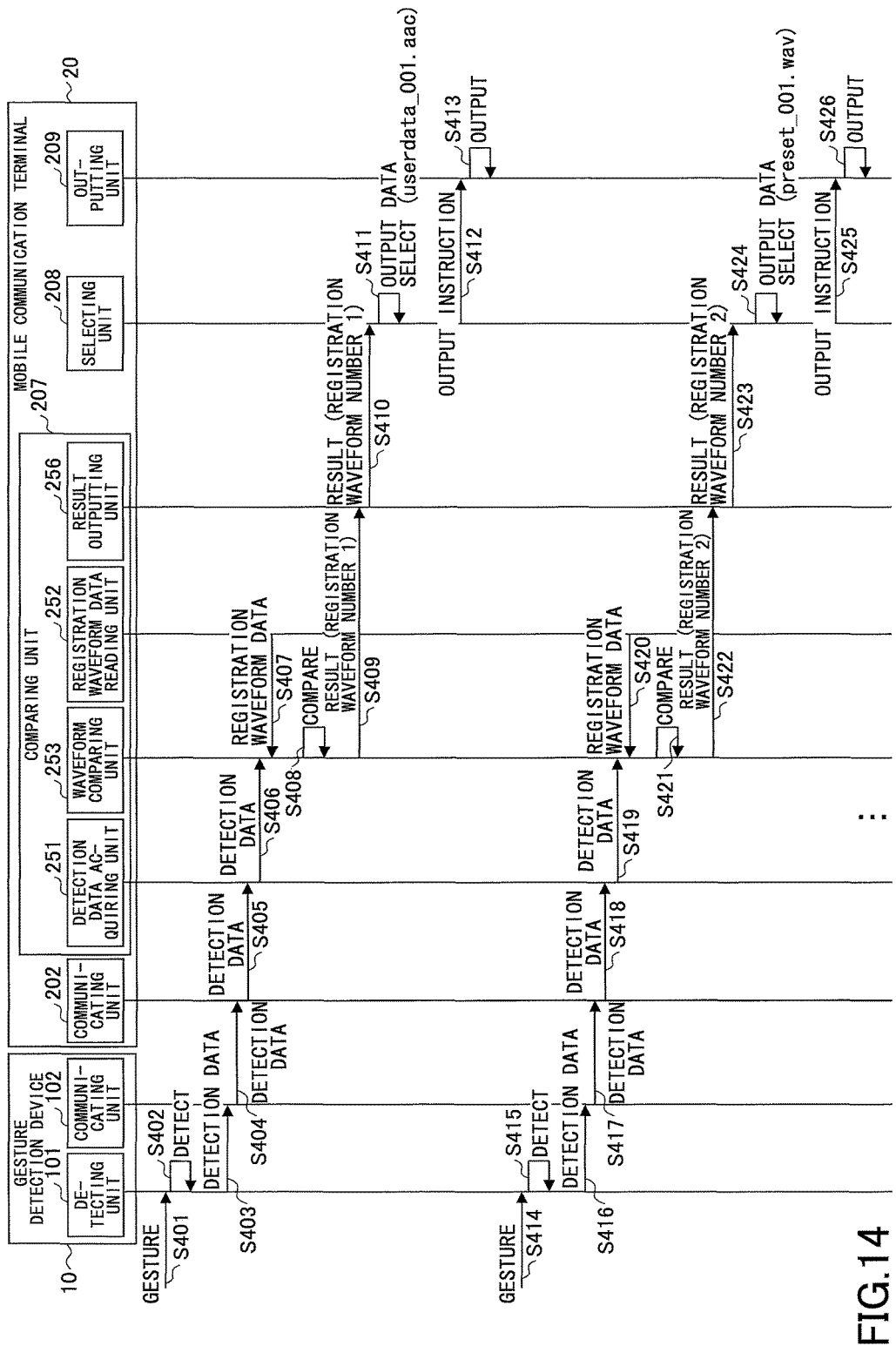
FIG. 14 is a sequence diagram of a specific example of an output process.

Referring to FIG. 14, a specific description is given of the output process executed by the gesture detection system 1. It is assumed that the user has activated an application by the mobile communication terminal 20, the gesture detection device 10 and the mobile communication terminal 20 are in a communicable state, and the toy 40 is in an operable state. Note that in the following description, the example of the association data 231-1 illustrated in FIG. 8 is used. The registration waveform data 232 corresponding to the registration waveform numbers "1" through "3" included in the association data 231-1 of FIG. 8 is illustrated in FIGS. 15 (a) through (c).

First, the user makes a gesture of operating the toy 40, with the gesture detection device 10 attached (step S401). The detecting unit 101 detects the values of acceleration in three axial directions applied to the detecting unit 101 according to the gesture of the user (step S402). The detecting unit 101 transfers the detected values as detection data, to the communicating unit 102 (step S403). The communicating unit 102 sends the detection data to the communicating unit 202 of the mobile communication terminal 20 (step S404). The communicating unit 202 transfers the received detection data to the detection data acquiring unit 251 of the comparing unit 207 (step S405).

Here, the detection data may be received over a plurality of times from the gesture detection device 10 during a certain period. Here, the detection data used in the description is assumed to express an assembly of detection data items that have been received during a certain time period.

Figure 15:
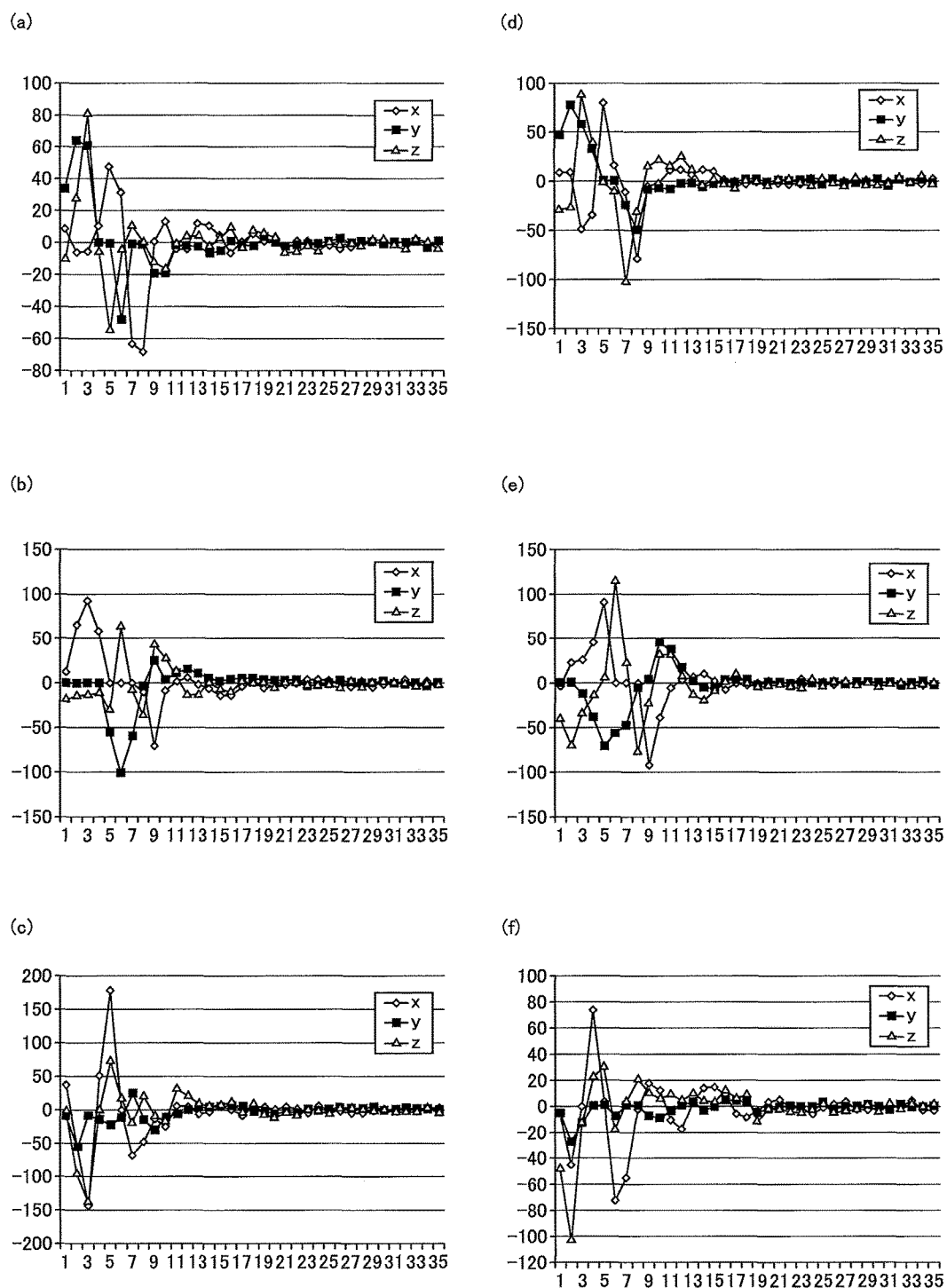
FIG. 15 is a diagram illustrating an example of waveform data expressing a gesture of a user.

The waveform comparing unit 253 receives the detection data illustrated in FIG. 15 (d), from the detection data acquiring unit 251 (step S406). Furthermore, the waveform comparing unit 253 receives registration waveform data (here, the waveform data of FIGS. 15 (a) through (c)) read by the registration waveform data reading unit 252 (step S407). Then, the waveform comparing unit 253 compares the received detection data with the registration waveform data (step S408). For example, the waveform comparing unit 253 obtains the distance between these data items by a method described in, for example, non-patent literature 1, 2, and obtains a result as indicated by "gesture 1" of FIG. 16. Here, the distance between the detection data (FIG. 15 (d)) and the registration waveform number 1 (that is, FIG. 15 (a)) is "720". Similarly, the distance between the detection data and the registration waveform number 2 (FIG. 15 (b)) is "1019", and the distance between the detection data and the registration waveform number 3 (FIG. 15 (c)) is "1170". Therefore, the waveform comparing unit 253 transfers the registration waveform number 1, which is nearest to the detection data, as the result of comparison, to the result outputting unit 256 (step S409).

The selecting unit 208 receives a "registration waveform number 1", which is the result of comparison, from the result outputting unit 256 of the comparing unit 207 (step S410). Next, the selecting unit 208 refers to the association data 231, and selects the output data "userdata_001.aac" corresponding to the "registration waveform number 1", as the data to be output (step S411). Next, the selecting unit 208 instructs the outputting unit 209 to output the selected output data (step S412). The outputting unit 209 outputs "userdata_001.aac" (step S413).

Subsequently, by further gestures by the user, similar to step S401 through S406 described above, the waveform comparing unit 253 receives the example of the detection data illustrated in FIG. 15 (e) (steps S414 through S419). Similar to steps S407, S408 described above, the waveform comparing unit 253 compares the detection data with the registration waveform data, calculates a distance indicated by "gesture 2" of FIG. 16, and identifies the registration waveform number "2" of the registration waveform data that is most similar (steps S420, S421). Then, by the same processes as those of steps S409 through S413 described above, the outputting unit 209 outputs the output data "preset_001.wav" corresponding to the registration waveform number "2" (steps S422 through S426).

Subsequently, similarly, the above processes are repeated until the user ends the application by an operation, and the output data according to the gesture of the user is output by the mobile communication terminal 20. For example, when the waveform data as illustrated in FIG. 15 (f) is detected, the distances between the detected waveform data and the respective registration waveform data items of FIGS. 15 (a) through (c) are as indicated by "gesture 3" of FIG. 16. As a result, output data "preset_002.wav" associated with the registration waveform number "3", is output.

As described above, as the user attaches the gesture detection device 10 according to the present embodiment to the existing toy 40, and makes a predetermined gesture, a voice sound corresponding to the gesture can be output by the mobile communication terminal 20. Furthermore, by using the registration function, the user is able to register a desired gesture and a desired voice sound. As a result, particularly, a user such as a child is able to experience a new playing activity, by using the exiting toy 40 and the mobile communication terminal 20.

<<Example of Using Threshold Data/Application>>

In the example described by referring to FIGS. 11 through 16, the threshold data 233 and the waveform comparing unit 253 are not used. That is, the functions of the threshold data reading unit 254 and the threshold comparing unit 255 of the comparing unit 207, and the application data updating unit 210 are not used. On the other hand, in the following, referring to FIGS. 17 through 19, a description is given of an example of using the threshold data 233 and the application data 235, and using the functions of the threshold data reading unit 254 and the threshold comparing unit 255 of the comparing unit 207, and the application data updating unit 210.

Figure 17:
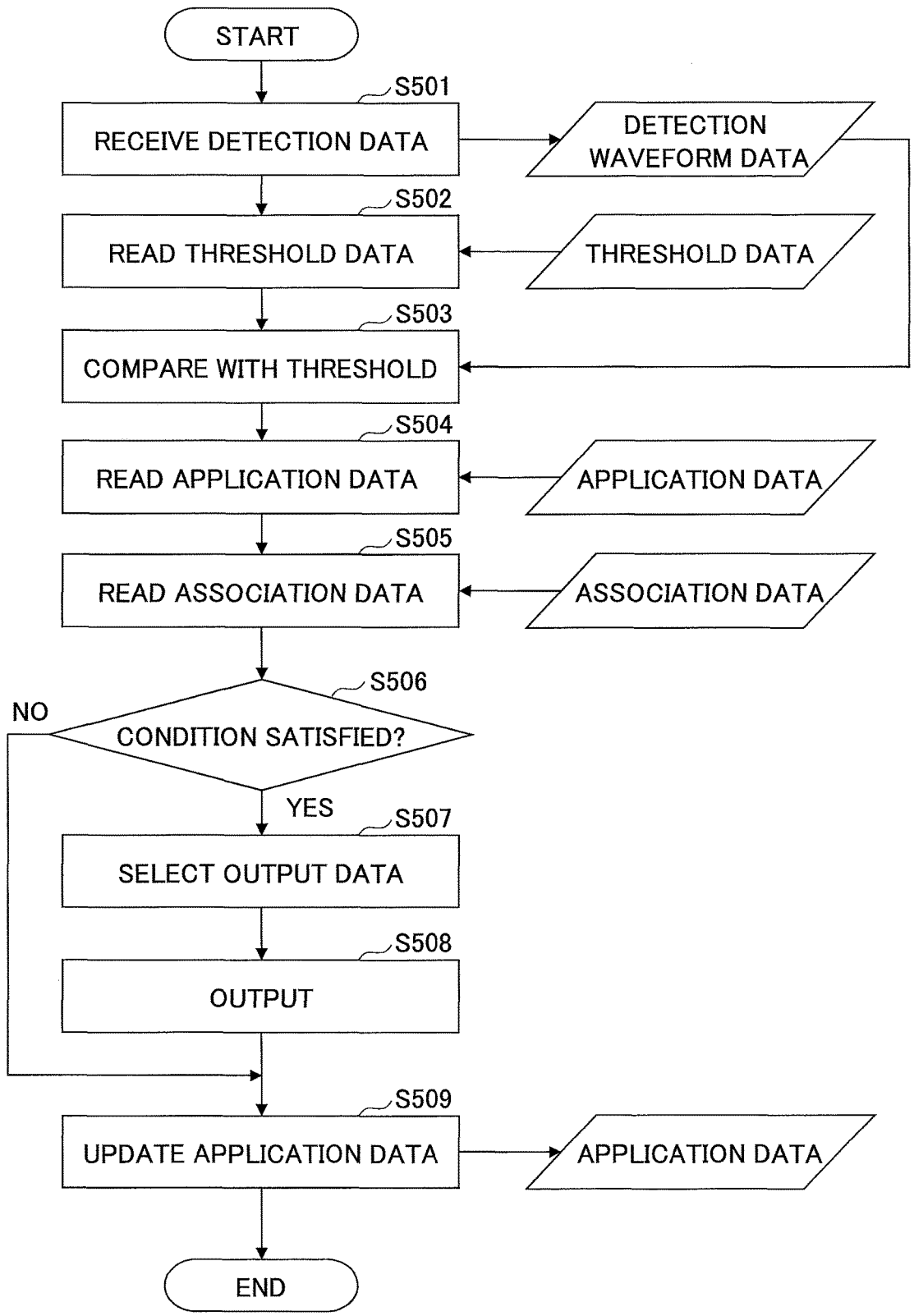
FIG. 17 is a flowchart of an output process.

Referring to FIG. 17, a description is given of the output process executed by the gesture detection system 1, in a case where the threshold data 233 and the application data 235 are used. Similar to the output process described by referring to FIG. 12, the output process illustrated in FIG. 17 is executed from a state after the gesture detection device 10 and the mobile communication terminal 20 are connected by wireless communication, and the user has operated the mobile communication terminal 20 to execute the output function. That is, the output process is executed from a state in which the switching unit 204 of the mobile communication terminal 20 described above has switched the function to be executed by the mobile communication terminal 20, to an output function. In this state, the user operates the toy 40, in a state where the gesture detection device 10 is attached.

First, the comparing unit 207 (detection data acquiring unit 251) receives the detection data sent from the gesture detection device 10, through the communicating unit 202 (step S501). Next, the threshold data reading unit 254 reads the threshold data (for example, the thresholds A, B, and C of the respective axial directions) (step S502). Next, the threshold comparing unit 255 compares the maximum value of the detection data of each axis (for example, FIG. 7 (b)) acquired by the detection data acquiring unit 251, with the thresholds A, B, and C of each axis indicated by the threshold data read by the threshold data reading unit 254 (step S503).

Next, the selecting unit 208 reads the application data 235 such as a flag and output history of the output data, etc., stored in the storage unit 201 (step S504). Next, the selecting unit 208 reads the association data 231-2 or 231-3 (step S505). Then, when the condition is satisfied (YES in step S506), the selecting unit 208 selects the output data corresponding to the satisfied condition (step S507). Then, the outputting unit 209 outputs the output data selected in step S507 (step S508).

After step S508, or when the condition is not satisfied in step S506, the application data updating unit 210 updates the application data 235 (flag and output history of output data), according to need (step S509).

Note that the above processes are repeatedly executed while the user is operating the toy 40, similar to the processes described by referring to FIG. 12.

<<Example of Using Flag that Becomes Effective According to Predetermined Gesture>>

Figure 18:
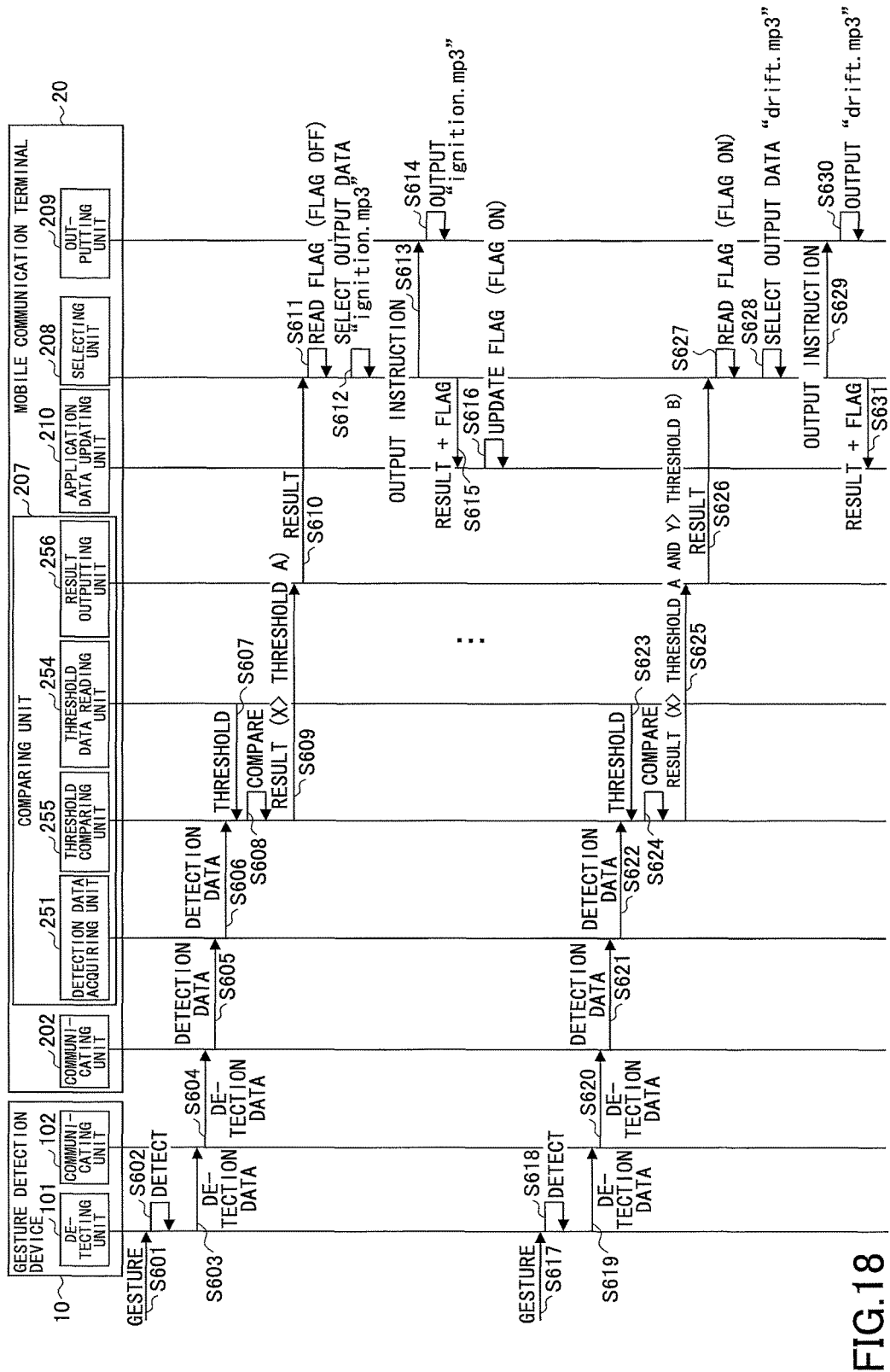
FIG. 18 is a sequence diagram of a specific example of an output process.

Referring to FIG. 18, a description is given of a specific example of the output process using the threshold data 233 and the application data 235. Here, the application data 235 is a flag that becomes effective according to a predetermined gesture, and it is assumed that the flag is initially OFF. Similar to the example described by referring to FIG. 14, it is assumed that the user has activated an application by the mobile communication terminal 20, the gesture detection device 10 and the mobile communication terminal 20 are in a communicable state, and the toy 40 is in an operable state.

First, steps S601 through S605 in which the user makes a gesture, and the detection data acquiring unit 251 of the mobile communication terminal 20 acquires the detection data detected by the gesture detection device 10, are the same as steps S401 through S405 of FIG. 14. The threshold comparing unit 255 receives detection data from the detection data acquiring unit 251 (step S606). Furthermore, the threshold comparing unit 255 receives the threshold data (here, the thresholds A, B, and C of accelerations in the respective axial directions) read by the threshold data reading unit 254 (step S607). Then, the threshold comparing unit 255 compares the maximum value of the acceleration of each axis included in the received detection data, with each of the thresholds A, B, and C (step S608). Here, it is assumed that the maximum value of the acceleration in the X axis direction exceeds the threshold A, and the maximum values of the acceleration in the Y, Z axis directions are less than the thresholds B, C, respectively. The threshold comparing unit 255 transfers the result of comparison (X>A) to the result outputting unit 256 (step S609).

The selecting unit 208 receives the result of comparison "X>A" from the result outputting unit 256 of the comparing unit 207 (step S610). Next, the selecting unit 208 reads the application data (flag) stored in the storage unit 201 (step S611). Here, it is assumed that the flag is "OFF". Then, the selecting unit 208 refers to the association data 231-2 (FIG. 9), and selects, as the data to be output, the output data "ignition.mp3", corresponding to the condition (threshold) "X>A" and the condition (application data) "flag OFF" (step S612). Next, the selecting unit 208 instructs the outputting unit 209 to output the selected output data (step S613). The outputting unit 209 outputs "ignition.mp3" (step S614).

Furthermore, the application data updating unit 210 receives the result of comparison "X>A" and application data "flag OFF" from the selecting unit 208 (step S615). Then, the application data updating unit 210 updates the application data 235 stored in the storage unit 201, to "flag ON" (step S616). Note that the application data updating unit 210 performs the process of updating the application to "flag ON", only when the result of comparison "X>A" and application data "flag OFF" are received.

Subsequently, according to further gestures by the user, similar to steps S601 through S606 described above, the threshold comparing unit 255 receives detection data (steps S617 through S622). Similar to steps S607, S608 described above, the threshold comparing unit 255 compares the maximum value of the acceleration of each axis included in the detection data, with each of the thresholds A, B, and C (steps S623, S624). Then, similar to steps S609, S610 described above, the threshold comparing unit 255 transfers the result of comparison to the selecting unit 208 (steps S625, S626). Note that here, the result of comparison is assumed to be "X>A and Y>B".

Next, the selecting unit 208 reads the application data flag ON" stored in the storage unit 201 (step S627). The selecting unit 208 refers to the association data 231-2, and selects, as the data to be output, output data "drift.mp3" corresponding to the condition (threshold) "X>A and Y>B" and (application data) "flag ON" (step S628). Next, the selecting unit 208 instructs the outputting unit 209 to output the selected output data (step S629). The outputting unit 209 outputs "drift.mp3" (step S630).

Furthermore, the application data updating unit 210 receives the result of comparison "X>A and Y>B" and application data "flag ON", from the selecting unit 208 (step S631). Here, the application data updating unit 210 does not update the application data.

By the above operations, the user can attach the gesture detection device 10 according to the present embodiment to, for example, a toy passenger vehicle, operate the toy, and enjoy sounds corresponding to movements of a real passenger vehicle, through the mobile communication terminal 20 according to the present embodiment.

Note that in the above examples of gestures, the positive direction of the X axis corresponds to the travelling direction of the passenger vehicle, the positive direction of the Y axis corresponds to the right direction of the passenger vehicle, and the positive direction of the Z axis corresponds to the direction directly above the passenger vehicle. That is, in the state of "flag OFF" (in a state where the engine is not started up), when the passenger vehicle is operated to travel forward, as indicated by the association data 231-1 of FIG. 9, "ignition.mp3", which is the sound of starting up an engine, is output. Furthermore, in the state of "flag ON" (in a state where the engine is started), when the passenger vehicle is operated to further travel forward, "drive.mp3", which is the driving sound of an engine, is output. Furthermore, in the state where the engine is started, when operations of moving to the left and right directions are detected, "drift.mp3", which is a drifting sound, is output, and when operations of moving up and down are detected, "crash.mp3", which is a crashing sound, is output. Furthermore, after crashing, the application data updating unit 210 changes the flag to OFF.

<<Example of Using History of Output Data>>

Figure 19:
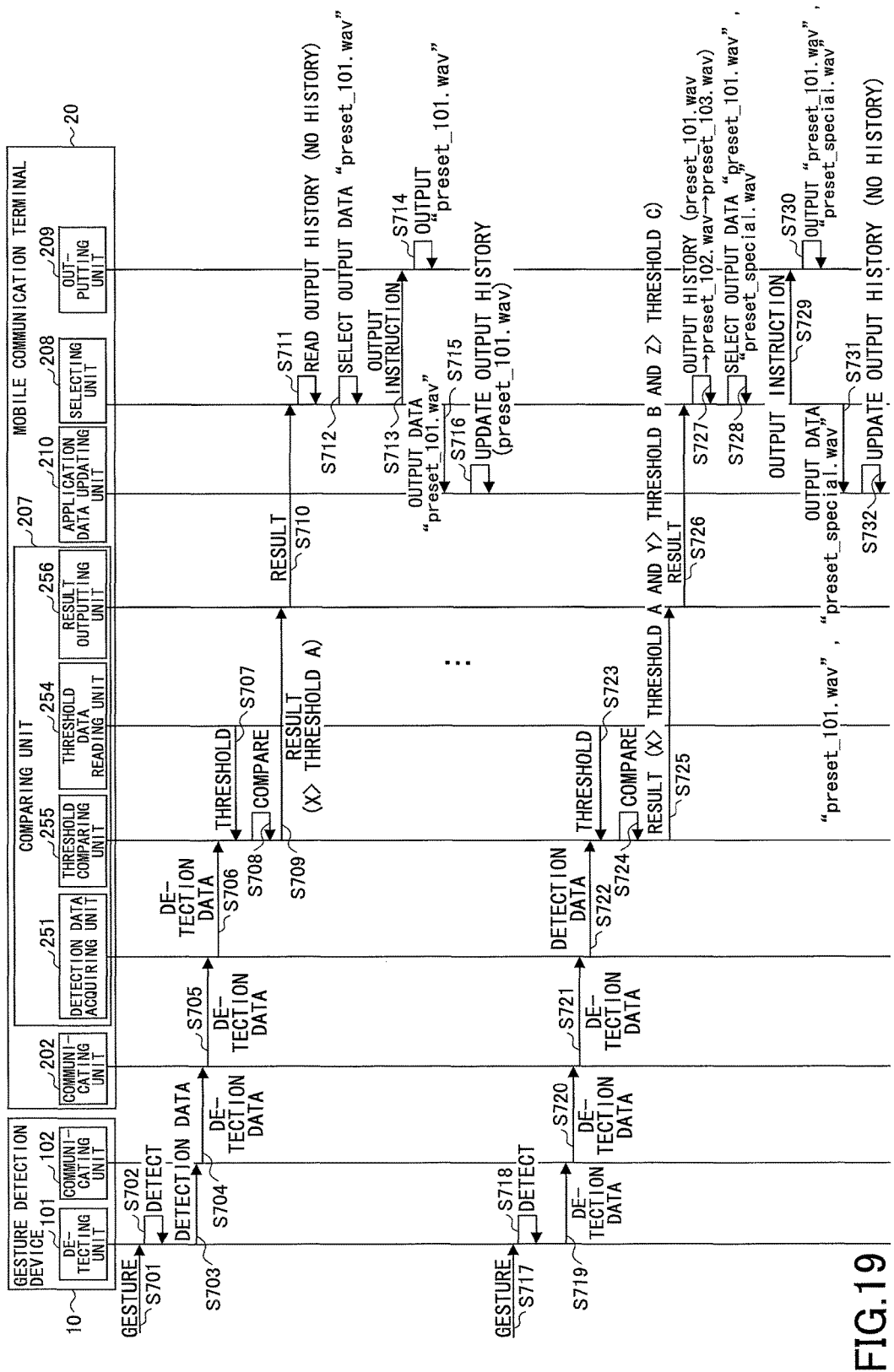
FIG. 19 is a sequence diagram of a specific example of an output process.

Referring to FIG. 19, a description is given of a different specific example of the output process using the threshold data 233 and the application data 235. Here, the application data 235 is the output history of the output data output by the mobile communication terminal 20. Similar to the examples described by referring to FIGS. 14 and 18, it is assumed that the user has activated an application by the mobile communication terminal 20, the gesture detection device 10 and the mobile communication terminal 20 are in a communicable state, and the toy 40 is in an operable state.

First, steps S701 through S710 in which the mobile communication terminal 20 receives the detection data detected by the gesture detection device 10, compares the detection data with a threshold, and transfers the result to the selecting unit 208, are the same as steps S601 through S610 of FIG. 18. Note that it is assumed that the result of comparison by the threshold comparing unit 255 is also "X>A", similar to the example described by referring to FIG. 18. Next, the selecting unit 208 reads the application data (output history) stored in the storage unit 201 (step S711). Here, it is assumed that the output history is empty (no history). The selecting unit 208 refers to the association data 231-3 (FIG. 10), and selects, as the data to be output, the output data "preset_101.wav", corresponding to the condition (threshold) "X>A" and the condition (output history) "no history" (step S712). Next, the selecting unit 208 instructs the outputting unit 209 to output the selected output data (step S713). The outputting unit 209 outputs "preset_101.wav" (step S714).

Next, the application data updating unit 210 receives the file name "preset_101.wav" of the selected output data, from the selecting unit 208 (step S715). Then, the application data updating unit 210 records "preset_101.wav" in the output history that is the application data 235 stored in the storage unit 201 (step S716).

Subsequently, by further gestures by the user, the same processes as steps S701 through S716 described above are repeated, and the output history that is the application data 235 becomes "preset_101.wav→preset_102.wav→preset_103.wav".

Similar to steps S701 through S706 described above, the threshold comparing unit 255 receives detection data (steps S717 through S722). Similar to steps S707, S708 described above, the threshold comparing unit 255 compares the maximum value of the acceleration of each axis included in the detection data, with each of the thresholds A, B, and C (steps S723, S724). Then, similar to steps S709, S710 described above, the threshold comparing unit 255 transfers the result of comparison to the selecting unit 208 (steps S725, S726). Note that here, the result of comparison is assumed to be "X>A and Y>B and Z>C".

Next, the selecting unit 208 reads the output history "preset_101.wav→preset_102.wav→preset_103.wav" stored in the storage unit 201 (step S727). The selecting unit 208 refers to the association data 231-3 (FIG. 10), and selects, as the data to be output, output data "preset_103.wav" and "preset_special.wav" corresponding to the condition (threshold) "X>A and Y>B and Z>C" and condition (output history) "preset_101.wav→preset_102.wav→preset_103.wav" (step S728). Next, the selecting unit 208 instructs the outputting unit 209 to output the selected output data (step S729). The outputting unit 209 outputs "preset_103.wav" and subsequently outputs "preset_special.wav" (step S730).

Next, the application data updating unit 210 receives the file names "preset_103.wav" and "preset_special.wav" of the selected output data, from the selecting unit 208 (step S731). Then, the application data updating unit 210 updates the output history that is the application data 235 stored in the storage unit 201, to "no history" (step S732).

By the above operations, the user can attach the gesture detection device 10 according to the present embodiment to, for example, any kind of the toy 40 or to his own arm, freely make gestures, and enjoy sounds output according to certain rules, through the mobile communication terminal 20 according to the present embodiment. In the example of the above operations, a sound that is separately set is emitted, only when three kinds of movements (sounds), which have been set in advance, are performed in a predetermined order.

<<5. Examples of Applications>>

In the above, descriptions are given of an example of outputting a predetermined sound when waveform data indicating a detected gesture is deemed to match waveform data that is registered in advance (FIG. 14), and an example of outputting a predetermined sound when the maximum value of the acceleration of detection data and application data satisfy a predetermined condition (FIGS. 18, 19). However, the present invention is not limited to the above examples; for example, predetermined output data may be output when the detected waveform data matches waveform data that is registered in advance, and when another condition (for example, a threshold or application data) is satisfied. On the other hand, in the present invention, detection data may be determined by using only a threshold condition, and predetermined output data may be output.

Furthermore, in the above examples, a description is given of an example where the gesture detection device 10 includes an acceleration sensor. However, in the present invention, even when the gesture detection device 10 includes a photosensor or a pressure sensor, similarly, the same effects can be achieved by executing the above processes by using data expressing variations in the light volume or pressure.

<<B. Distribution System>>

Next, by referring to FIGS. 20 through 30, a description is given of a distribution system 100 including the gesture detection system 1 described above.

<<1. Overview>>

Figure 20:
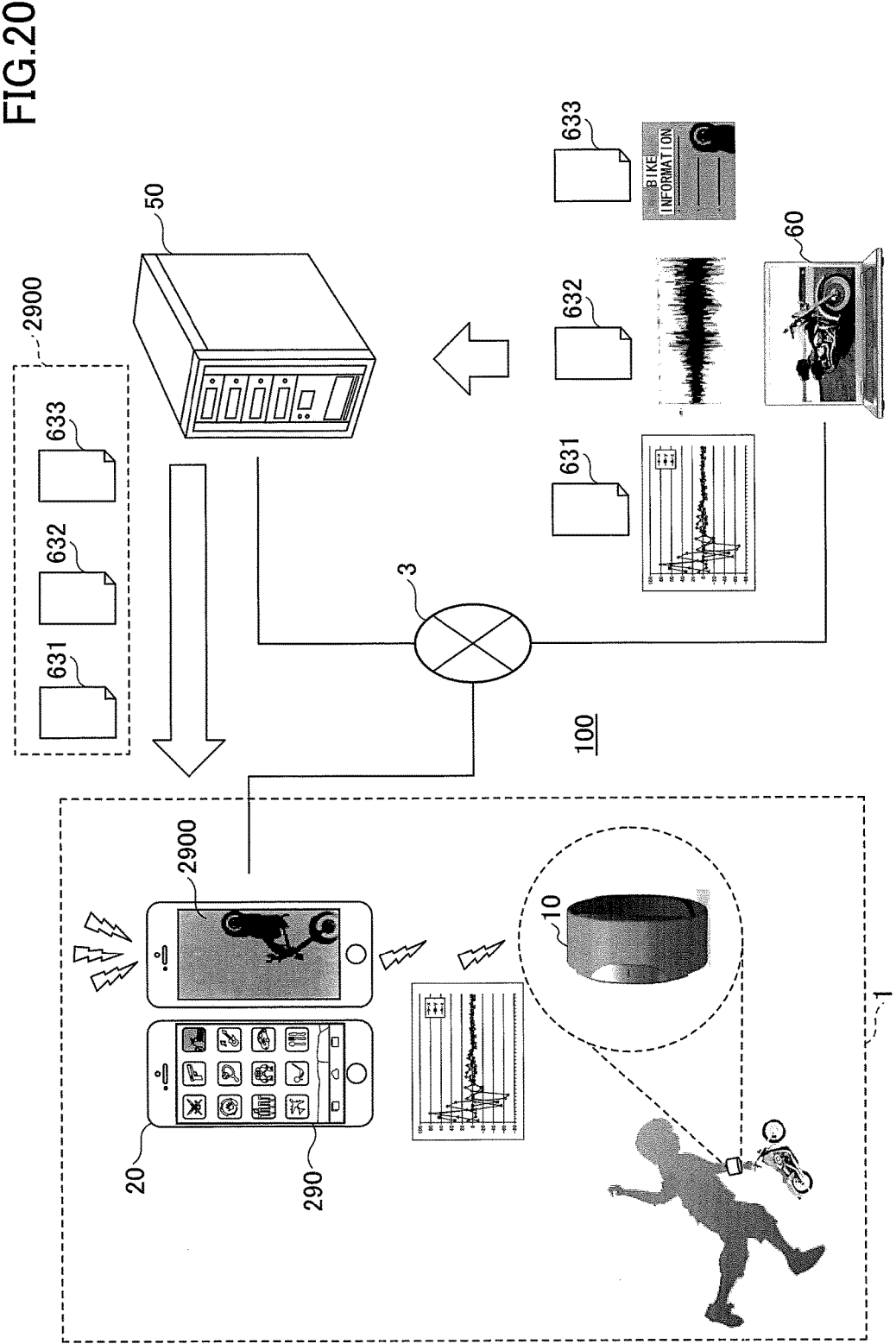
FIG. 20 indicates an overview of the present invention.

FIG. 20 is a diagram illustrating the overview of the distribution system 100. The distribution system 100 includes a distribution device 50 for distributing advertisements and an information processing terminal 60 used by the advertiser, in addition to the gesture detection device 10 and the mobile communication terminal. 20 included in the gesture detection system 1 described above. The mobile communication terminal 20, the distribution device 50, and the information processing terminal 60 are connected by a network 3 such as the Internet. However, in the embodiment described below, the mobile communication terminal 20 used by the user and the information processing terminal 60 used by the advertiser do not directly communicate with each other.

The distribution device 50 provides an application 290 for detecting a gesture of a user and outputting a voice sound, described as the gesture detection system 1, to the mobile communication terminal 20.

Here, as described above, when a user using the gesture detection device 10 makes a gesture registered in advance (for example, a playing activity of swinging a sword and a playing activity of manually moving a bike), the application 290 outputs voice sound data (output data 234) associated with the gesture. That is, the application 290 is mainly realized by processes by the functional blocks surrounded by the dashed line in FIG. 5 (excluding the data), in a case where the mobile communication terminal 20 executes the "output function" described above.

As illustrated in FIG. 20, the application 290 first presents a plurality of icons corresponding to gestures on a screen, and accepts a selection from the user. Next, the application 290 outputs a predetermined screen relevant to the gesture, according to the selection from the user, and receives detection data from the gesture detection device 10. Then, the application 290 compares the detection data with the registration waveform data 232 indicating a gesture registered in advance as described above, and when the application 290 deems that the detection data and the registration waveform data 232 match each other, the application 290 reproduces the output data 234 registered in advance.

The distribution device 50 is able to distribute, to the mobile communication terminal 20, data (the registration waveform data 232 and the output data 234 of FIG. 5) relevant to the gesture, in response to a request from the user. Accordingly, the types of gestures that the user can experience, are expanded. For example, the distribution device 50 is able to distribute the relevant data, as an application-in-application 2900 operating in the application 290 operating as the platform, to the mobile communication terminal 20.

Furthermore, the distribution device 50 receives registration waveform data relevant to a certain gesture (hereinafter referred to as gesture data 631), output data (hereinafter referred to as voice sound data 632), and advertisement data 633, in response to a request from the information processing terminal 60 used by the advertiser. These data items are closely related to the business implemented by the advertiser. For example, it is assumed that the advertiser is a manufacturer of a prominent motorcycle (hereinafter referred to as bike). The advertiser registers the gesture data 631 corresponding to a gesture of manually moving the bike back and forth, the voice sound data 632 of the start-up sound (or the stopping sound) of the engine, and the advertisement data 633 that is display data such as an image of the bike or a catalogue, in the distribution device 50. Here, the advertiser pays a price to the distribution device 50 or the provider of the application 290.

Note that here, the voice sound data 632 and the advertisement data 633 are distinguished; however, the voice sound data 632 per se may be advertisement data for an advertisement. For example, when the advertisement data is a brand of the advertiser expressed by a sound, or a voice sound relevant to the article of the advertiser (for example, the engine sound of a bike), the voice sound data 632 also acts as the advertisement data 633. The advertiser may register the gesture data 631 and the voice sound data 632 also acting as advertisement data, in the distribution device 50. Alternatively, in addition to the gesture data 631 and the voice sound data 632 also acting as advertisement data, the advertiser may register additional advertisement data 633 such as the display data described above, in the distribution device 50.

The distribution device 50 distributes, to the mobile communication terminal 20 of the user, a combination of the gesture data 631, the voice sound data 632, and the advertisement data 633, in the format of the application-in-application 2900 (here, a combination of these data items is referred to as an "application-in-application"). When the application 290 detects a gesture corresponding to the gesture data 631 provided as the application-in-application 2900, the application 290 outputs the voice sound data 632. Furthermore, while the gestures are detected, or after a particular gesture is detected, the application-in-application 2900 outputs the advertisement data 633. Accordingly, the user is able to view an advertisement while enjoying gestures and voice sound relevant to an article or a service a certain advertiser.

In the following, details of the distribution system 100 according to an embodiment of the present invention are described.

<<2. Hardware Configuration>>

Figure 21:
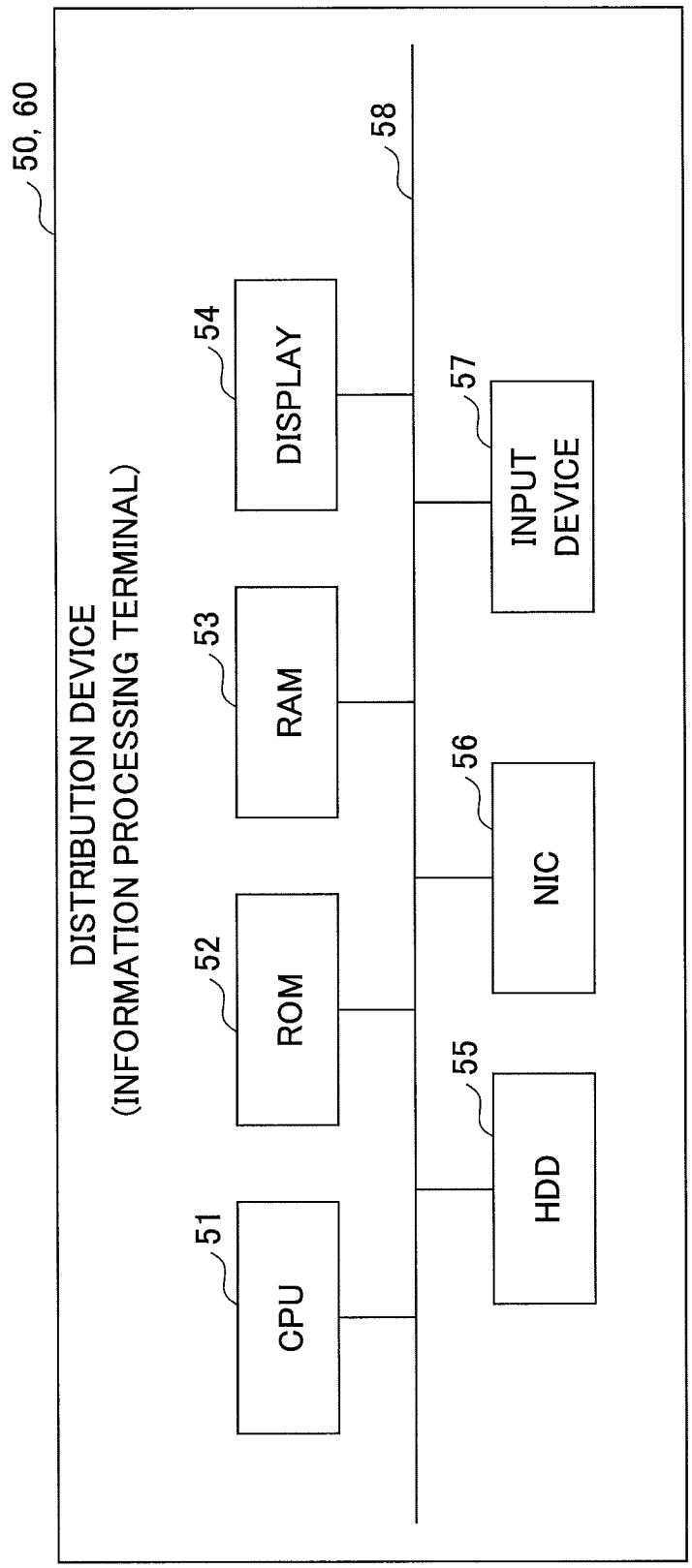
FIG. 21 is a hardware configuration diagram of a distribution device according to an embodiment of the present invention.

FIG. 21 is a hardware configuration diagram of the distribution device 50 and the information processing terminal 60 according to an embodiment of the present invention. FIG. 21 illustrates and example of a hardware configuration, in a case where the distribution device 50 and the information processing terminal 60 are a general computer. The following description is given only for the distribution device 50. The distribution device 50 includes a CPU 51, a ROM 52, a RAM 53, a display 54, a HDD (Hard Disk Drive) 55, a NIC (Network Interface Card) 56, and an input device 57.

The CPU 51 executes programs for controlling the distribution device 50. The ROM 52 stores programs executed by the CPU 51 and data necessary for executing the programs. The RAM 53 functions as a work area of the CPU 51. The display 54 is a device for outputting video data by driving, for example, a liquid crystal panel. The HDD 55 is a device that can revolve a platter at high speed, and use a magnetic head to magnetically read and write data. The NIC 56 is an interface for connecting the distribution device 50 to a LAN. The input device 57 is a device such as a keyboard or a mouse that can read operation inputs from a user as electric signals. A bus 58 interconnects the above devices.

Note that the distribution device 50 may be realized by a plurality of distributed computers. The distribution device 50 can realize the functions described below, by loading the programs arranged in the ROM 52, the HDD 55, or a network, into the RAM 53, and using the CPU 51 to execute the programs. Furthermore, the distribution device 50 may store files in, for example, a cloud storage area provided via a network, instead of storing the files in the HDD 55. Furthermore, the distribution device 50 may not include the display 54 or the input device 57, when the distribution device 50 operates as a server for providing functions to a client terminal used by the administrator.

Furthermore, the information processing terminal 60 may include a wireless communication device instead of the NIC 56. Furthermore, the information processing terminal 60 may be a device such as a smartphone or a tablet having the same hardware configuration as that of the mobile communication terminal 20 illustrated in FIG. 4.

<<3. Functions>>

Figure 22:
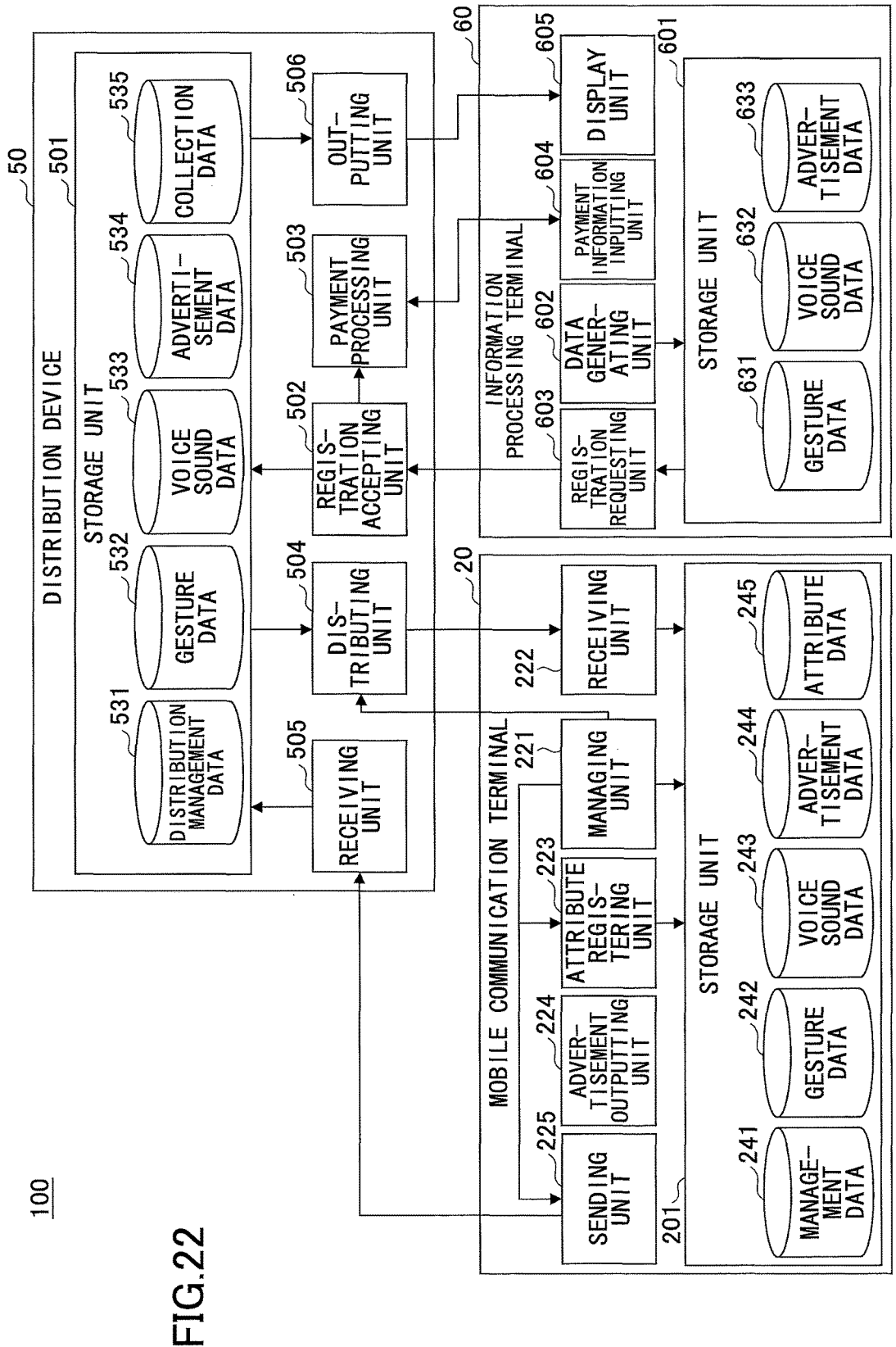
FIG. 22 is a functional block diagram of a distribution system according to an embodiment of the present invention.

Referring to FIG. 22, a description is given of the functional blocks of the distribution system 100 according to an embodiment of the present invention.

<<Distribution Device>>

The distribution device 50 includes a storage unit 501, a registration accepting unit 502, a payment processing unit 503, a distributing unit 504, a receiving unit 505, and an outputting unit 506.

The storage unit 501 is realized by the HDD 55 illustrated in FIG. 21, and stores files relevant to operations of the distribution device 50. Particularly, the storage unit 501 stores distribution management data 531, gesture data 532, voice sound data 533, advertisement data 534, and collection data 535.

The distribution management data 531 is data for managing gesture data, voice sound data, and advertisement data distributed by the distribution device 50.

FIG. 23 illustrates an example of a table storing the distribution management data 531. The distribution management data 531 includes the items of an ID, a name, gesture data, voice sound data, and advertisement data. An ID is an identifier for identifying an entry in the table. A name is the name for identifying the application-in-application.

The item of gesture data expresses a file name of a file storing values of variations in the acceleration or the angular velocity in two or three axial directions (or a combination of these values) within a predetermined time. For example, FIGS. 15 (a) through (c) illustrate an example of gesture data, expressed by variations in the acceleration in three axial directions within a predetermined time. The gesture data is data in any format, expressing variations of values of three-dimensions, output by the acceleration sensor or the angular velocity sensor installed in the gesture detection device 10.

The item of voice sound data expresses the file name of a file storing a voice sound output when a gesture corresponding to the gesture data is detected. The voice sound data is data in any format that can be reproduced by the mobile communication terminal 20, such as mp3 (MPEG Audio Layer-3), aac (Advanced Audio Coding), and the WAVE format.

The item of advertisement data expresses a file name of a file storing an advertisement output to the mobile communication terminal 20. The advertisement data is data of any format that can be displayed or reproduced by the mobile communication terminal 20 or the application 290, such as HTML, MOV, and SWF (Small Web Format).

FIGS. 27 (b), (c) illustrate examples of advertisement data displayed on the mobile communication terminal 20. Note that the advertisement data may not be the advertisement data per se, but may be a URL to the advertisement data on the Internet.

The gesture data 532 is data defining a gesture of a user, registered by the information processing terminal 60 of the advertiser. As described above, the gesture data expresses values of variations in the acceleration or the angular velocity in two or three axial directions (or a combination of these values) within a predetermined time.

The voice sound data 533 is data defining a voice sound reproduced according to a gesture of the user, registered by the information processing terminal 60 of the advertiser. Note that as described above, the voice sound per se may indicate an advertisement of the advertiser.

The advertisement data 534 is data expressing the advertisement presented to the user, registered by the information processing terminal 60 of the advertiser. Note that as described above, when the voice sound data 533 indicates an advertisement, the advertisement data 534 does not have to be registered. Alternatively, even when the voice sound data 533 indicates an advertisement, the advertisement data 534 may be registered.

The collection data 535 is statistic data collected from users of the application-in-application 2900, operating in the application 290.

FIG. 24 illustrates an example of a table storing the collection data 535 of one of the application-in-application items. The collection data 535 expresses information collected from each of the users of the corresponding application-in-application, and includes the items of gender, age, country, frequency, and time and date. The gender expresses the gender of the user, and "F" expresses female and "M" expresses male. The age expresses the age of the user. The country expresses an abbreviation of the country where the user lives. In the example of FIG. 24, "JP" expresses Japan, "US" expresses the United States of America, and "DE" expresses the Federal Republic of Germany. The time and date expresses the time and date when the application-in-application has been activated. The frequency expresses the number of times of activating the corresponding application-in-application. The collection data 535 is sent from the mobile communication terminal 20 to the distribution device 50, when the user activates the application-in-application, or at any timing set in advance.

The registration accepting unit 502 is mainly realized by processes by the CPU 51 of FIG. 21, and accepts a request to register the gesture data 631, the voice sound data 632, and the advertisement data 633, etc., from the information processing terminal 60 used by the advertiser. When the registration request is accepted, the registration accepting unit 502 instructs the payment processing unit 503 to perform a payment process. Then, when the registration accepting unit 502 receives a report indicating that payment is possible, the registration accepting unit 502 stores the received gesture data 631, the voice sound data 632, and the advertisement data 633, etc., in the storage unit 501. On the other hand, when the registration accepting unit 502 receives a report indicating that payment is not possible, the registration accepting unit 502 is able to reject the registration request.

The payment processing unit 503 is mainly realized by processes by the CPU 51 of FIG. 21, and requests the information processing terminal 60, which has sent the registration request, to input payment information. Then, the payment processing unit 503 determines whether payment is possible based on the input payment information, and sends a report indicating whether payment is possible to the registration accepting unit 502. Then, the payment processing unit 503 performs a process on the sales data relevant to payment, etc. Here, the payment process includes a process using any existing payment method such as a method using a credit card, Pay-easy, and PayPal (registered trademark).

The distributing unit 504 is mainly realized by processes by the CPU 51 of FIG. 21, and distributes data relevant to the specified application-in-application, according to a distribution request from the mobile communication terminal 20 used by the user (or the application 290 operating in the mobile communication terminal 20). When the distribution request is received, the distributing unit 504 distributes the application-in-application specified in the distribution request (that is, a combination of the gesture data 532, the voice sound data 533, and the advertisement data 534), to the mobile communication terminal 20.

The receiving unit 505 is mainly realized by processes by the CPU 51 and the NIC 56 of FIG. 21, and receives statistic information of each user of the application-in-application 2900 (attribute data described below), sent from the mobile communication terminal 20.

The outputting unit 506 is mainly realized by processes by the CPU 51 and the NIC 56 of FIG. 21, and outputs the aggregate data of the collection data 535 relevant to the application-in-application 2900 in any format, to the advertiser. For example, the outputting unit 506 is able to output the male/female ratio of users of each country, the age distribution of users, the correlation of the age and the activation frequency, and the aggregation of the activation time periods, etc., with respect to a certain application-in-application 2900.

FIG. 28 indicates graphs formed by aggregating the collection data 535 of users of a certain application-in-application 2900 and outputting the aggregation results. FIG. 28 (a) is a bar graph formed by outputting the number of male users and the number of female users of the certain application-in-application 2900 for each country. Accordingly, the advertiser is able to know the tendency in the number of users for each country. Furthermore, FIG. 28 (b) is a sequential line graph formed by outputting the usage frequency of all users of the certain application-in-application 2900 in each time period. Accordingly, the advertiser is able to know the usage tendency of users in each time period.

<<Information Processing Terminal>>

The information processing terminal 60 includes a storage unit 601, a data generating unit 602, a registration requesting unit 603, a payment information inputting unit 604, and a display unit 605.

The storage unit 601 is realized by the HDD 55 of FIG. 21, and stores files relevant to operations of the information processing terminal 60. Particularly, the storage unit 601 stores gesture data 631, voice sound data 632, and advertisement data 633, which respectively correspond to the gesture data 532, the voice sound data 533, and the advertisement data 534 described above. The content of each data item is as described already.

The data generating unit 602 is mainly realized by processes by the CPU 51 of FIG. 21, and generates the gesture data 631 to be registered in the distribution device 50. As described already, the gesture data 631 indicates variations in the acceleration or variations in the angular velocity in two or three dimensional directions, or a combination of these values, within a predetermined time. For example, the data generating unit 602 may set data obtained through a device including an acceleration sensor or an angular velocity sensor, as the gesture data 631. The data generating unit 602 may generate the gesture data 631 by using, for example, the gesture detection device 10 described above, which is configured to be communicable with the information processing terminal 60. The data generating unit 602 stores the generated gesture data 631 in the storage unit 601.

The registration requesting unit 603 is mainly realized by processes by the CPU 51 of FIG. 21. The registration requesting unit 603 sends, to the distribution device 50, a request to register the gesture data 631, the voice sound data 632, and the advertisement data 633 stored in the storage unit 601, in response to an instruction from the advertiser using the information processing terminal 60.

Note that the voice sound data 632 and the advertisement data 633 are prepared in advance by the advertiser. For example, when the gesture data 631 generated by the data generating unit 602 corresponds to a gesture of making a toy bike to travel forward, the voice sound data 632 may be the start-up sound of an engine. When the advertiser is a manufacturer of bikes, the advertisement data 633 may be advertisement data including an image of a bike and a link to the newest catalog.

Examples of the advertisement data 633 are illustrated in FIGS. 27 (b), (c). Here, two types of advertisement data 633 are prepared; the advertisement data of FIG. 27 (b) is always displayed when the user uses the application-in-application, and the advertisement data of FIG. 27 (c) is displayed when the user has correctly made a gesture corresponding to the gesture data 631.

The payment information inputting unit 604 is mainly realized by processes by the CPU 51 and the input device 57 of FIG. 21, and accepts an input of payment information from the advertiser, and sends the payment information to the payment processing unit 503 of the distribution device 50.

The display unit 605 is mainly realized by processes by the display 54 of FIG. 21, and displays the collection data 535 output from the distribution device 50, on the display 54.

<<Mobile Communication Terminal>>

The mobile communication terminal 20 includes a managing unit 221, a receiving unit 222, an attribute registering unit 223, an advertisement outputting unit 224, and a sending unit 225, in addition to the functions 201 through 210 described by referring to FIG. 5.

First, the storage unit 201 already described, further stores management data 241, gesture data 242, voice sound data 243, advertisement data 244, and attribute data 245.

The management data 241 is data for managing the application-in-application operating in the application 290 distributed to the mobile communication terminal 20.

FIG. 25 illustrates an example of a table storing the management data 241. The management data 241 includes the same items as those of the distribution management data 531 illustrated in FIG. 23. The management data 241 is data for identifying the name of the application-in-application 2900 distributed to the mobile communication terminal 20, and the gesture data, etc.

The gesture data 242 corresponds to the registration waveform data 232 illustrated in FIG. 5, and is data that is compared with detection data detected by the gesture detection device 10, by the application 290.

The voice sound data 243 corresponds to the output data 234 of FIG. 5, and the voice sound data 243 is reproduced when the application 290 determines that the gesture data 242 and the detection data match each other.

The attribute data 245 stores information registered in advance by a user, and information relevant to the usage of the application-in-application 2900, before the application-in-application 2900 is used.

FIG. 26 illustrates an example of a table storing the attribute data 245 of a certain user. The attribute data 245 includes the same items as the collection data 535 illustrated in FIG. 24.

The managing unit 221 is mainly realized by processes by the CPU 21 of FIG. 4, and manages the application-in-application 2900 used in the application 290. Here, a description is given of operations of the application 290.

FIG. 27 (a) illustrates a selection screen of the application-in-application 2900, output by the application 290. For example, this screen is displayed in response to a user performing an operation to activate the application 290 installed in the mobile communication terminal 20. Subsequently, the application 290 reads the application-in-application 2900 stored in the management data 241, and a list of the application-in-applications 2900 can be displayed on the screen. As the user selects one of the application-in-applications 2900 in the list, the user can experience a playing activity in line with the objective of each application-in-application 2900.

Subsequently, the application 290 reads the gesture data 242, the voice sound data 243, and the advertisement data 244 in the selected one of the application-in-applications 2900. Next, the application 290 displays the advertisement data 244 on the screen, as illustrated in FIG. 27 (b), through the advertisement outputting unit 224. Then, the application 290 reproduces the voice sound data 243, when the detection data detected from the gesture detection device 10 used by the user and the gesture data 242 are deemed to be the same. Furthermore, the application 290 may display different advertisement data 244 on the screen, when the detection data and the gesture data 242 are deemed to be the same.

Note that, as already described, the application 290 compares the detection data with the gesture data 242 by making a determination according to a threshold. As the threshold used for the comparison, a default value set in the application 290 in advance may be used, or a threshold may be separately defined for each of the application-in-applications 2900. When the threshold is separately defined for each of the application-in-applications 2900, the threshold may be provided from the distribution device 50, together with the gesture data 242, the voice sound data 243, and the advertisement data 244.

Furthermore, the managing unit 221 sends a request to distribute the application-in-application 2900 specified by the user, to the distribution device 50. Furthermore, the managing unit 221 stores information relevant to the distributed application-in-application 2900, in the management data 241. Furthermore, when the application-in-application 2900 is used for the first time, the managing unit 221 instructs the attribute registering unit 223 to prompt the input of attribute information, such as the gender, the age, and the country or residence. Furthermore, the managing unit 221 records the usage frequency of the application-in-application 2900 selected by the user, and the usage time and date, in the attribute data 245. Furthermore, the managing unit 221 instructs the sending unit 225 to send the attribute data 245 stored in the storage unit 201 to the distribution device 50, at any timing.

The receiving unit 222 is mainly realized by the CPU 21 and the wireless communication device 27 of FIG. 4, and receives the application-in-application 2900 distributed from the distribution device 50.

The attribute registering unit 223 is mainly realized by processes by the CPU 21 and the input device 28 of FIG. 4, and accepts input of attribute information from the user, in response to an instruction from the managing unit 221. The attribute registering unit 223 stores the input attribute information as the attribute data 245.

The advertisement outputting unit 224 is mainly realized by the CPU 21 and the display 24 of FIG. 4. The advertisement outputting unit 224 outputs the advertisement outputting unit 224 associated with the application-in-application 2900 on the display 24, in response to the application 290 accepting a selection of the application-in-application 2900. Furthermore, the advertisement outputting unit 224 may output different advertisement data 244 on the display 24, in response to an output instruction to output data (step S713 of FIG. 19), from the selecting unit 208 of FIG. 5. The different advertisement data 244 is, for example, the second advertisement data item, when two advertisement data items are specified in the management data 241.

Furthermore, when a plurality of advertisement data items are specified in the management data 241, the advertisement outputting unit 224 may select and output different advertisement data items according to the attribute information (gender, age, and country, etc.) of the user, indicated in the attribute data 245. For example, when advertisement data items are prepared for different genders, the advertisement outputting unit 224 may output different advertisement data items according to the gender of the user indicated by the attribute data 245.

Note that when the gesture detection device 10 includes a display device (not shown), the above advertisement outputting unit 224 may output the advertisement outputting unit 224 to a display device of the gesture detection device 10, instead of to the display 24. In this case, for example, the advertisement outputting unit 224 may output the advertisement data 244 to the gesture detection device 10 by wireless communication, via the wireless communication device 27.

The sending unit 225 is mainly realized by the CPU 21 and the wireless communication device 27 of FIG. 4, and sends the attribute data 245 to the distribution device 50 in response to an instruction from the managing unit 221.

Note that in the present embodiment, the advertiser is able to register the gesture data 631, the voice sound data 632, and the advertisement data 633 in the distribution device 50, and the distribution device 50 provides the application-in-application 2900 including these data items, to the mobile communication terminal 20. However, the present invention is not limited to a combination of data as described above. For example, instead of the voice sound data 632, image data, video data, data storing a blinking pattern of LED included in the mobile communication terminal 20, and data storing a driving pattern for driving a vibrator of the mobile communication terminal 20, may be provided to the distribution device 50 together with the gesture data 631 and the advertisement data 633. In this case, the mobile communication terminal 20, which has received the above data instead of the voice sound data 632, may output corresponding image data or video data, blink the LED according to the blinking pattern, and drive the vibrator according to the driving pattern, when a gesture indicated by the gesture data 631 is detected.

<<4. Examples of Operations>>

Figure 29:
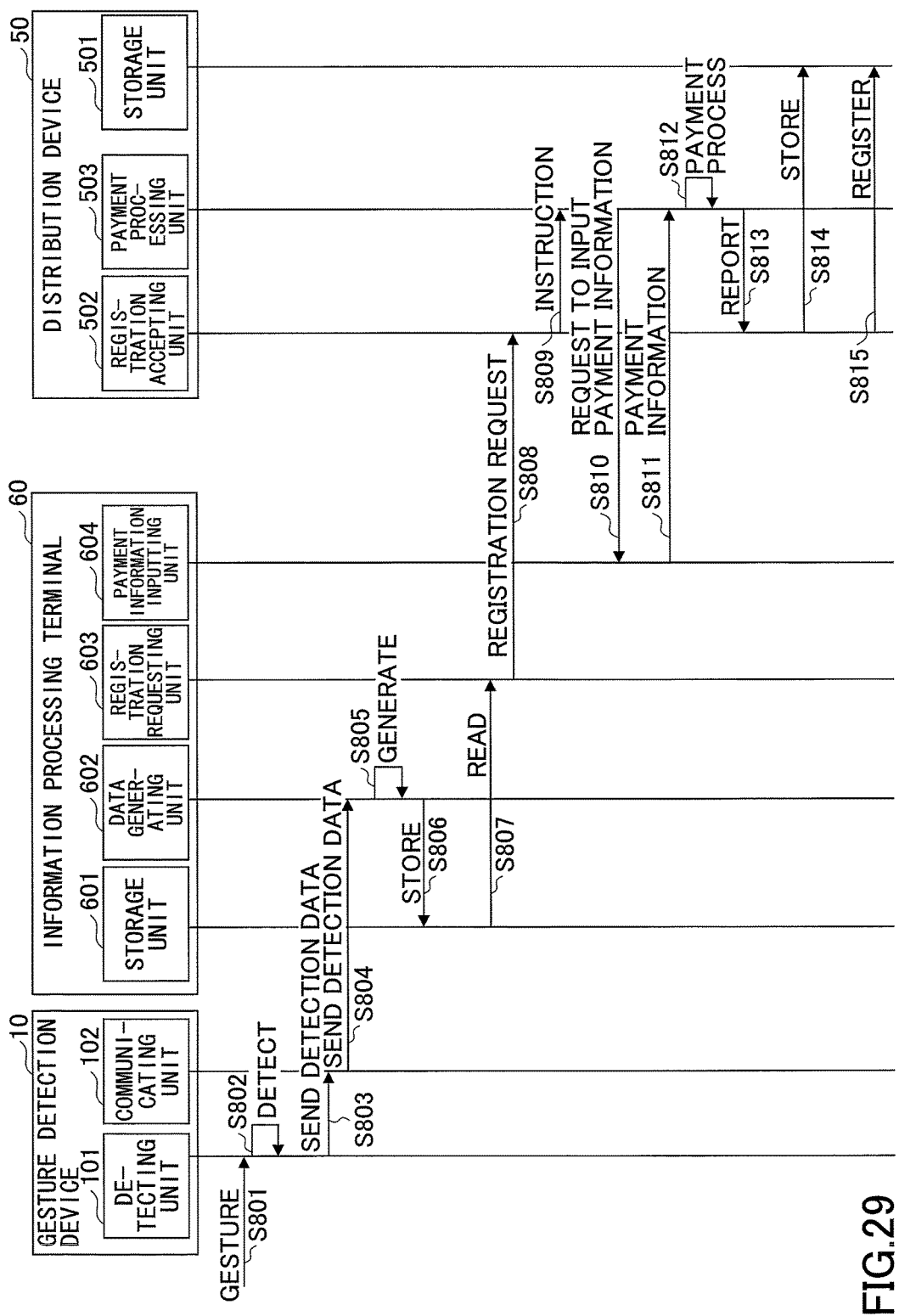
FIG. 29 is a sequence diagram of a specific example of an advertisement data registration process.
Figure 30:
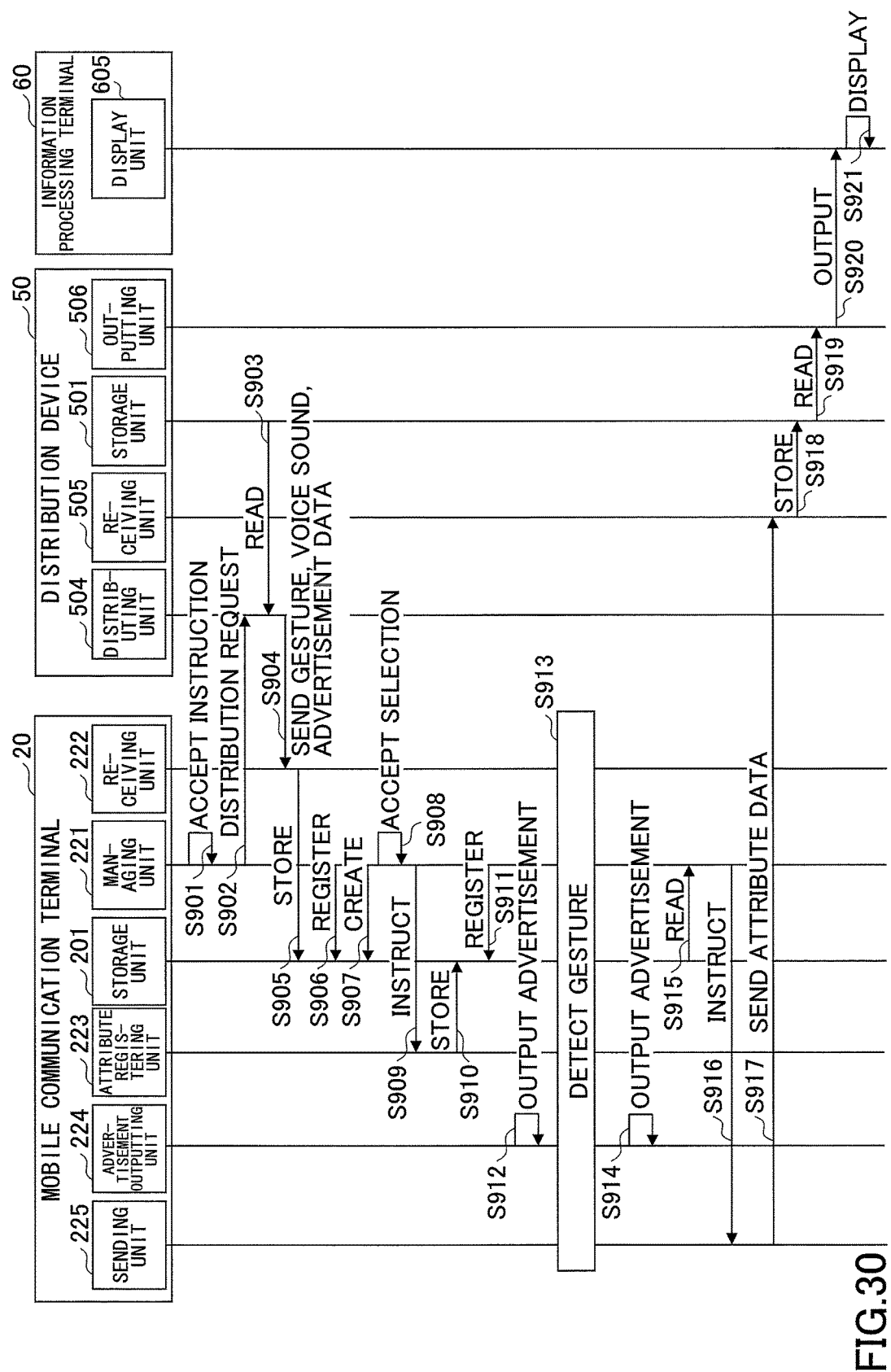
FIG. 30 is a sequence diagram of a specific example of an advertisement data output process.

Referring to FIGS. 29 and 30, a description is given of examples of operations of the distribution system 100 according to an embodiment of the present invention. In the following example, a description is given of an example in which the advertiser that is the manufacturer of the bike provides the application-in-application 2900 with a name "bike".

<<Advertisement Data Registration Process>>

FIG. 29 is a sequence diagram illustrating a specific example of the advertisement data registration process. In the following example, it is assumed that the advertiser has acquired, by using the gesture detection device 10, gesture data corresponding to a gesture of making a toy bike travel.

First, the advertiser wears the gesture detection device 10, for example, on his arm, and makes a gesture of moving a toy bike forward (step S801). Accordingly, the detecting unit 101 of the gesture detection device 10 detects variations in the values of the acceleration and the angular velocity. for example, in three axial directions (step S802). The detecting unit 101 transfers the detected values of acceleration and angular velocity (detection data) to the communicating unit 102 (step S803). The communicating unit 102 sends the detection data to the information processing terminal 60 used by the advertiser, for example, by wireless communication by BLUETOOTH (registered trademark) (step S804).

The data generating unit 602 of the information processing terminal 60 uses the detection data received from the communicating unit 102 of the gesture detection device 10, to generate the gesture data 631 (step S805). For example, the data generating unit 602 sets the detection data (that is, variations in the values of the acceleration and the angular velocity) acquired between an acquisition start time point and an acquisition end time point set in advance, as the gesture data 631. Subsequently, the data generating unit 602 stores the generated gesture data 631 in the storage unit 601 (step S806). Here, it is assumed that the gesture data 631 is stored by a file name "acceleration.dat".

Next, the registration requesting unit 603 of the information processing terminal 60 reads, from the storage unit 601, the gesture data 631, the voice sound data 632, and the advertisement data 633, in response to an instruction from the advertiser (step S807). Here, it is assumed that the registration requesting unit 603 reads the voice sound data 632 having a file name "acceleration.mp3", and advertisement data items 633 having file names "bikeinfo.html" and "bikeinfo_award.html". Note that among the advertisement data items 633, "bikeinfo_award.html" is a HTML file displaying the screen illustrated in FIG. 27 (b). Furthermore, that among the advertisement data items 633, "bikeinfo_award.html" is a HTML file displaying the screen illustrated in FIG. 27 (c). The images displayed in the screens may be provided together with the HTML file or may be provided from an external server through the Internet.

Next, the registration requesting unit 603 of the information processing terminal 60 sends a registration request, together with the gesture data 631, the voice sound data 632, and the advertisement data 633 read in step S807, to the distribution device 50 (step S808). Here, the registration requesting unit 603 may send the information of the name "Bike" of the application-in-application 2900, together with the registration request. Next, when the registration request is accepted, the registration accepting unit 502 of the distribution device 50 instructs the payment processing unit 503 to perform a payment process (step S809). Next, the payment processing unit 503 requests the information processing terminal 60, which has sent the registration request, to input payment information (step S810). Here, for example, it is assumed that the advertiser has input payment information relevant to credit card payment, including a credit card number, the cardholder, the expiration date, and a security code. The payment information inputting unit 604 of the information processing terminal 60 accepts the payment information input by the advertiser, and sends the payment information to the payment processing unit 503 (step S811).

Next, the payment processing unit 503 of the distribution device 50 performs a payment process by using the received payment information (step S812). For example, the payment processing unit 503 makes a credit referral to a credit card company, and determines whether payment is possible. Then, when the payment processing unit 503 determines that payment is possible, the payment processing unit 503 sends a report indicating that payment is possible, to the registration accepting unit 502 (step S813). In response to receiving the report, the registration accepting unit 502 stores the gesture data 631, the voice sound data 632, and the advertisement data 633 received in step S808, in the storage unit 501 (step S814).

Furthermore, the registration accepting unit 502 generates a new entry in the table storing the distribution management data 531, and registers the file name, etc., of various data items received in step S814 (step S815). Here, as indicated in the first entry of FIG. 23, data is registered in each item. Note that the registration accepting unit 502 registers a numeric value "1", which does not overlap with existing entries, in the item of ID, and registers the name "Bike" received together with the registration request, in the item of name.

<<Advertisement Data Output Process>>

FIG. 30 is a sequence diagram illustrating a specific example of the advertisement data output process. Here, a description is given of an example in which a user, who is using the mobile communication terminal 20 and the gesture detection device 10, downloads the application-in-application "Bike", which has been registered by the advertiser described above.

First, the managing unit 221 of the mobile communication terminal 20 accepts an instruction to acquire a new application-in-application operating in the application 290, from the user (step S901). At this time, it is assumed that the managing unit 221 has accepted a specification of a name "Bike" of an application-in-application, from the user. The managing unit 221 sends a request to distribute the application-in-application "Bike", to the distributing unit 504 of the distribution device 50 (step S902). The distributing unit 504 of the distribution device 50 refers to the distribution management data 531, and reads, from the storage unit 501, the gesture data 532, the voice sound data 533, and the advertisement data 534 corresponding to the name "Bike" specified in the distribution request (step S903). Then, the distributing unit 504 sends the gesture data 532, the voice sound data 533, and the advertisement data 534 that have been read, to the receiving unit 222 of the mobile communication terminal 20 as an application-in-application "Bike" (step S904).

The receiving unit 222 of the mobile communication terminal 20 stores the received data in the storage unit 201 (step S905). Next, the managing unit 221 generates a new entry in the table storing the management data 241, and registers the file name, etc., of the data of the application-in-application "Bike" received in step S904 (step S906). Here, as indicated in the first entry of FIG. 25, data is registered in each item. Note that the managing unit 221 registers a numeric value "1", which does not overlap with existing entries, in the item of ID, and registers the name "Bike" of the application-in-application in the item of name. Furthermore, the managing unit 221 registers the time and date "2014-05-10 10:00:00" when various kinds of data have been received in step S904, in the item of the time and date. Furthermore, the managing unit 221 creates a table storing the attribute data 245 illustrated in FIG. 26 (step S907). At this time point, no data is registered in this table.

Next, in the screen illustrated in FIG. 27 (a), which is output by the application 290, the managing unit 221 accepts an operation of selecting the application-in-application "Bike" (step S908). The managing unit 221 detects that the application-in-application "Bike" has been activated for the first time, and instructs the attribute registering unit 223 to prompt the user to input attribute information (step S909). The attribute registering unit 223 stores the attribute information in the attribute data 245 in the storage unit 201, based on input of attribute information from the user (step S910). Here, as illustrated in FIG. 26, it is assumed that attribute information in which the gender is "F", the age is "12", and the country is "JP", is input. Then, the managing unit 221 sets the frequency as "1" in the attribute data illustrated in FIG. 26, and registers the present time and date "2014-05-10 10:00:00" in the item of the time and date (step S911).

Subsequently, the application 290 reads the gesture data "acceleration.dat", the voice sound data "acceleration.mp3", and the advertisement data 244 "bikeinfo.html" and "bikeinfo_award.html", etc., of the application-in-application "Bike", and shifts to a state of being capable of detecting detection data from the gesture detection device 10 used by the user. At this time, the advertisement outputting unit 224 of the mobile communication terminal 20 outputs the first advertisement data "bikeinfo.html", to the display 24 (step S912). FIG. 27 (b) illustrates an example of a screen output to the display 24.

Subsequently, the application 290 detects the gesture of the user and reproduces corresponding voices sound data (step S913), by the same procedures as steps S601 through S614 of FIG. 18 and steps S701 through S714 of FIG. 19. However, here, the flag used in the example of FIG. 18 or the output history used in the example of FIG. 19 may not be used. That is, the application 290 may unconditionally reproduce the voice sound data "acceleration.mp3", when the detection data obtained from the gesture of the user is deemed to be the same as the gesture data "acceleration.dat".

Next, in response to the voice sound data "acceleration.mp3" being reproduced (in response to the user making a gesture expressed by the gesture data "acceleration.dat"), the advertisement outputting unit 224 outputs the second advertisement data "bikeinfo_award.html" to the display 24 (step S914). FIG. 27 (c) illustrates an example of a screen output to the display 24.

Subsequently, the managing unit 221 reads the attribute data 245 stored in the storage unit 201 (step S915). Next, the managing unit 221 instructs the sending unit 225 to send the attribute data 245 that has been read, to the distribution device 50 (step S916). Next, the sending unit 225 sends the attribute data to the receiving unit 505 of the distribution device 50 (step S917). The receiving unit 505 of the distribution device 50 stores the received attribute data as one entry in the table storing the collection data 535 (step S918). Note that when the receiving unit 505 has already received attribute data from the same mobile communication terminal 20, the receiving unit 505 may overwrite the entry storing the attribute data that has already been received.

Next, the outputting unit 506 of the distribution device 50 reads the collection data 535 of the storage unit 501 (step S919). Next, the outputting unit 506 aggregates the collection data according to a setting by the administrator, and outputs the aggregate result to the display unit 605 of the information processing terminal 60 used by the advertiser (step S920). The display unit 605 of the information processing terminal 60 displays the aggregate result on the display 54 (step S921). FIG. 28 illustrates an example of a screen displaying the aggregate result.

Note that when a plurality of advertisement data items are included in the application-in-application, the advertisement outputting unit 224 of the mobile communication terminal 20 may output different advertisement data according to the attribute information of the user such as the gender and the age, etc., registered as the attribute data 245. At this time, the advertisement data is associated in advance with the attribute information, which is a condition for being output.

<<5. Effects>>

According to the distribution system 100 according to the present embodiment, the provider of an article or a service is able to distribute an advertisement of the article or the service provided by himself, to a consumer using the gesture detection system 1 using the toy 40, the gesture detection device 10, and the mobile communication terminal 20. Particularly, the consumer pays more attention to the contents of the advertisement, by viewing the advertisement through a playing activity deeply related to the article or the service provided by the provider. For example, as the manufacturer of motorbikes provides an advertisement relevant to a motorbike to the consumer through an application for providing a playing activity using a toy motorbike, the consumer pays more attention to the advertisement. Furthermore, with respect to an article (bike) that the manufacturer wants to appeal, the manufacturer (advertiser) of the motorbike can register gestures and sound effects (sounds of an engine, etc.) by which the consumer can be reminded of the article, and the consumer can experience a playing activity using the gestures and sound effects. Accordingly, the consumer can be reminded of the article of the advertiser through the playing activity, and can also have a simulated experience of the article. Furthermore, when the distribution system 100 correctly recognizes a gesture defined in advance, the distribution system 100 can display an advertisement that gives some kind of a benefit to the consumer, to further enhance the effects of the advertisement. Furthermore, the distribution system 100 is able to collect information such as the attributes of the consumer who has viewed the advertisement and the time and date at which the consumer has probably viewed the advertisement through a playing activity. Accordingly, the effects of the advertisement can be confirmed, and the confirmed effects can be usefully applied in providing effective advertisements in the future.

REFERENCE SIGNS LIST 1 gesture detection system
10 gesture detection device
20 mobile communication terminal
40 toy
50 distribution device
60 information processing terminal
100 distribution system
631 gesture data
632 voice sound data
633 advertisement data

The invention claimed is:

1. A distribution system comprising:
   a mobile communication terminal for detecting a gesture of a user by using a gesture detection device that is wirelessly connected to the mobile communication terminal, and
   a distribution device that can communicate with the mobile communication terminal, the distribution device including:
   a processor configured to
      to accept registration of first acceleration data expressing a variation in acceleration within a predetermined time, and advertisement data indicating an advertisement to be displayed on the mobile communication terminal; and
      to distribute the first acceleration data and the advertisement data to the mobile communication terminal;
   the mobile communication terminal including:
   a second processor configured to
      compare the distributed first acceleration data with second acceleration data expressing the gesture of the user sent from the gesture detection device; and
      output the advertisement data, when the second processor makes the comparison.

2. The distribution system according to claim 1, wherein the second processor is further configured to:
   receive the second acceleration data from the gesture detection device that is worn by a body of the user.

3. The distribution system according to claim 2, wherein the second processor is further configured to:
   output predetermined voice sound data, when the first acceleration data and the second acceleration data are deemed to match each other as a result of the comparison by the second processor, wherein
   the processor is further configured to accept the registration of the voice sound data, in addition to the first acceleration data and the advertisement data.

4. The distribution system according to claim 3, wherein
   the voice sound data indicates a voice sound that is generated as a result of the gesture indicated by the first acceleration data, and
   the second processor is further configured to output the voice sound data while the first outputting unit is outputting the advertisement data.

5. The distribution system according to claim 4, wherein
   the second processor is further configured to output the advertisement data, when the first acceleration data and the second acceleration data are deemed to match each other as the result of the comparison by the second processor.

6. The distribution system according to claim 5, wherein the processor is further configured to:
   receive data relating to the output of the advertisement data from the mobile communication terminal; and
   output the data.

7. A distribution method executed by a distribution system including a mobile communication terminal for detecting a gesture of a user by using a gesture detection device that is wirelessly connected to the mobile communication terminal, and a distribution device that can communicate with the mobile communication terminal, the distribution method comprising:
   an accepting step, by the distribution device, of accepting registration of first acceleration data expressing a variation in acceleration within a predetermined time, and advertisement data indicating an advertisement to be displayed on the mobile communication terminal;
   a distributing step, by the distribution device, of distributing the first acceleration data and the advertisement data to the mobile communication terminal;

a comparing step, by the mobile communication terminal, of comparing the distributed first acceleration data with second acceleration data expressing the gesture of the user sent from the gesture detection device; and a first outputting step, by the mobile communication terminal, of outputting the advertisement data, when the comparison is made at the comparing step.

8. A distribution device that can communicate with a mobile communication terminal for detecting a gesture of a user by using a gesture detection device that is wirelessly connected to the mobile communication terminal, the distribution device comprising:

a processor configured to:

accept registration of first acceleration data expressing a variation in acceleration within a predetermined time, and advertisement data indicating an advertisement to be displayed on the mobile communication terminal; and distribute, to the mobile communication terminal, the first acceleration data, which is compared with second acceleration data expressing the gesture of the user sent from the gesture detection device, and the advertisement data, which is output when the comparison between the first acceleration data and the second acceleration data is made.

9. The distribution system according to claim 1, wherein the distribution device includes a plurality of distributed computers.

* * * * *